United States Patent
Yamato

(10) Patent No.: US 11,614,927 B2
(45) Date of Patent: Mar. 28, 2023

(54) OFF-LOAD SERVERS SOFTWARE OPTIMAL PLACEMENT METHOD AND PROGRAM

(71) Applicant: Nippon Telegraph and Telephone Corporation, Tokyo (JP)

(72) Inventor: Yoji Yamato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 55 days.

(21) Appl. No.: 17/432,701

(22) PCT Filed: Feb. 21, 2020

(86) PCT No.: PCT/JP2020/007255
§ 371 (c)(1),
(2) Date: Aug. 20, 2021

(87) PCT Pub. No.: WO2020/171234
PCT Pub. Date: Aug. 27, 2020

(65) Prior Publication Data
US 2022/0188086 A1 Jun. 16, 2022

(30) Foreign Application Priority Data
Feb. 22, 2019 (JP) .............................. JP2019-030871

(51) Int. Cl.
*G06F 8/41* (2018.01)
*G06F 8/60* (2018.01)
(52) U.S. Cl.
CPC . *G06F 8/60* (2013.01); *G06F 8/41* (2013.01)
(58) Field of Classification Search
CPC ................ G06F 8/41; G06F 8/60; G06F 9/50
See application file for complete search history.

(56) References Cited

U.S. PATENT DOCUMENTS

2019/0042232 A1* 2/2019 Trika .................... G06F 9/5055

FOREIGN PATENT DOCUMENTS

| JP | 2011186701 | 9/2011 |
|---|---|---|
| JP | 2017142581 | 8/2017 |
| JP | 2017204213 | 11/2017 |

OTHER PUBLICATIONS

Y. Yamato et al., "Proposal of Automatic GPU Offloading Technology on Open IoT Environment," 2018 IEEE 42nd Annual Computer Software and Applications Conference (COMPSAC), 2018, pp. 634-639, doi: 10.1109/COMPSAC.2018.10309. (Year: 2018).*

(Continued)

*Primary Examiner* — Hanh Thi-Minh Bui
(74) *Attorney, Agent, or Firm* — Fish & Richardson P.C.

(57) ABSTRACT

A software deployment method includes: analyzing a source code of an application; designating off-loadable processes of the application; performing a code conversion of the application according to a deployment destination environment; measuring the performance of the converted application on a verification device; making a setting for resource amounts according to the deployment destination environment; selecting a deployment place by calculating a deployment destination on the basis of a performance and a cost when the converted application is deployed while ensuring the resource amounts; performing, after deployment to an actual environment, a performance measurement test process to measure an actual performance of application; and performing, after performing the performance measurement test process, one or more of performing the code conversion, making the setting for resource amounts, selecting the deployment place, measuring the performance of the application on the verification device, and performing the performance measurement test process.

7 Claims, 9 Drawing Sheets

(56) References Cited

OTHER PUBLICATIONS

Roberto Rigamonti et al., "Transparent Live Code Offloading on FPGA," 2016, retrieved online on Dec. 2, 2022, pp. 1-9. Retrieved from the Internet: <URL: https://arxiv.org/pdf/1609.00130.pdf>. (Year: 2016).*
International Search Report in International Appln. No. PCT/JP2020/007255, dated May 12, 2020, 6 pages (with English translation).
Shirahata et al., "Hybrid Map Task Scheduling for GPU-Based Heterogeneous Clusters, "IEEE Second International Conference on Cloud Computing Technology and Science, Dec. 2010, 733-740.
Yamato et al., "Study of Automatic GPU Offloading Technology for Open IoT," IEICE Technical Report, May 25, 2018, 72:53-58, 7 pages (English abstract only).
Yamato et al., "Automatic GPU Off-loading Technology for Open IoT Environment," IEEE Internet of Things Journal, Sep. 2018, 10 pages.
Yamato et al., "Development of Template Management Technology for Easy Deployment of Virtual Resources on OpenStack," Journal of Cloud Computing, 2014, 3:7, 12 pages.
Yamato, "Automatic verification technology of software patches for user virtual environments on IaaS cloud," Journal of Cloud Computing, Feb. 2015, 4:4, 14 pages.
Yamato, "Server Selection, Configuration and Reconfiguration Technology for IaaS Cloud with Multiple Server Types," Journal of Network and Systems Management, Aug. 2017, 22 pages.

\* cited by examiner

OFF-LOAD SERVERS SOFTWARE OPTIMAL PLACEMENT METHOD AND PROGRAM

CROSS-REFERENCE TO RELATED APPLICATIONS

This is a National Stage Application of PCT Application No. PCT/JP2020/007255, filed on Feb. 21, 2020, which claims priority to Japanese Patent Application No. 2019-030871, filed on Feb. 22, 2019. The disclosure of the prior application is considered part of the disclosure of this application, and is incorporated in its entirety into this application.

TECHNICAL FIELD

The present invention relates to a software optimum deployment method of an off-load server and a program for automatically off-loading a functional process to an accelerator such as a graphics processing unit (GPU).

BACKGROUND ART

In recent years, the Internet of Things (IoT) technology has been advancing, and applications that use cloud technology to analyze and visualize data collected on the device side through the network have been increasingly available.

In the related art, IoT services are often built in silos in which devices, networks and applications are integrated. However, in order to reduce costs and provide a variety of services, the concept of OpenIoT, in which devices are shared by multiple applications and resources of cloud, network, and device are dynamically linked to provide services, is attracting attention.

In OpenIoT, it is expected that surveillance cameras owned by multiple organizations in a city will be shared and used for multiple applications, such as searching for lost children and finding terrorists. However, in this example, using image processing of camera images for multiple applications will require a huge amount of CPU computing resources, regardless of whether the analysis is performed on the device side or the cloud side.

On the other hand, in recent years, heterogeneous computing resources other than CPUs have been increasingly used in order to respond to various fields such as the IoT. For example, image processing has begun to be performed on servers with enhanced graphics processing units (GPUs) (accelerators) and signal processing has begun to be accelerated on field programmable gate arrays (FPGAs) (accelerators). Amazon web services (AWS) (registered trademark) provide GPU and FPGA instances and those resources can be used on demand. Microsoft (registered trademark) is using FPGAs to streamline search.

In the OpenIoT environment, various applications are expected to be created using the technology of service coordination, etc., and higher performance of operated applications can be expected by taking advantage of more advanced hardware. However, for that purpose, it is necessary to perform programing and setting in accordance with the hardware for the operation. For example, it requires knowledge of many technologies such as compute unified device architecture (CUDA) and open computing language (OpenCL), which is a high hurdle to overcome.

In order to make GPUs and FPGAs easily available to users' IoT applications, the following are required. Specifically, when deploying general-purpose applications such as image processing and cryptography to the OpenIoT environment, the OpenIoT platform should be able to analyze the application logic and automatically off-load processing to GPUs and FPGAs.

Off-Load to GPU

CUDA development environment for General Purpose GPUs (GPGPU), which use the computing power of GPUs for purposes other than image processing, has been increasingly developed. CUDA is a development environment for GPGPUs. In addition, OpenCL has emerged as a standard to handle heterogeneous hardware such as GPUs, FPGAs and many-core CPUs in a unified manner.

Development under CUDA and OpenCL involves programming with an extension of C language. It requires describing memory-to-memory copy/release operations between a CPU and devices like GPUs. Such description requires high skill. In fact, there are not so many engineers who can make full use of CUDA and/or OpenCL.

There is known a technique in which, for the purpose of using a GPGPU easily, a range of statements to be subjected to parallel processing, such as loop statements, is designated in a directive-based language and a compiler compiles the statements into device-specific code in accordance with the directives. Examples of the technical specification of such a technique include Open Accelerator (OpenACC) and examples of such a compiler include PGI compiler (registered trademark). In an example using OpenACC, a user designates, in a code written in C/C++/Fortran language, parallel processing or the like using OpenACC directives. PGI compiler checks whether the code is parallelizable and generates an executable binary for a GPU and an executable binary for a CPU and convert them into an executable module. IBM JDK (registered trademark) supports a function of off-loading designation of parallel processing in accordance with the lambda format of Java (registered trademark) to a GPU. Using these techniques, programmers need not be conscious of, for example, data allocation to GPU memory.

Thus, technologies such as OpenCL, CUDA, and OpenACC have made it possible to off-load processing to the GPU.

However, even if GPU processing is possible, there are still many issues to be solved for acceleration. For multi-core CPUs, there are compilers with automatic parallelization functions. Such compilers includes Intel compiler (registered trademark). Automatic parallelization includes extracting parallelizable parts such as for statements (iteration statements) of the program. However, when using GPUs, good performance may not be achieved in many cases due to the data transfer overhead between CPU and GPU memories. For acceleration using a GPU, it is required that a skilled person perform tuning with OpenCL and/or CUDA and/or find appropriate parallel processing part using PGI (registered trademark) compiler or the like (see Non-Patent Literature 1).

For this reason, it is difficult for an unskilled user to improve the performance of an application using GPUs and/or FPGAs. In addition, even when using an automatic parallelization technique, try-and-error operations are necessary to determine whether parallel processing can be performed, and there are cases in which acceleration is not possible.

Regarding IoT devices, with limited computing resources and the like, knowledge of embedded software, such as assembler programming, is currently required to perform detailed control of IoT devices. A single board computer such as Raspberry Pi (registered trademark) has limited resources, but it runs Linux (registered trademark), Java, etc., and therefore developers have the freedom to use Raspberry Pi as a gateway (GW) in order to collect and control data from multiple IoT devices. However, the number of IoT devices to be housed, how to divide processing workload among IoT devices and a single board computer, etc., differ depending on the application and usage style, and are required to be designed in accordance with the environment.

CITATION LIST

Non-Patent Literature

Non-Patent Literature 1: Y. Yamato, T. Demizu, H. Noguchi and M. Kataoka, "Automatic GPU Off-loading Technology for Open IoT Environment", IEEE Internet of Things Journal, DOI: 10.1109/JIOT.2018.2872545, September 2018.

Non-Patent Literature 2: K. Shirahata, H. Sato and S. Matsuoka, "Hybrid Map Task Scheduling for GPU-Based Heterogeneous Clusters", IEEE Second International Conference on Cloud Computing Technology and Science (CloudCom), pp. 733-740, December 2010.

Non-Patent Literature 3: Y. Yamato, "Automatic verification technology of software patches for user virtual environments on IaaS cloud", Journal of Cloud Computing, Springer, 2015, 4:4, DOI: 10.1196/s13677-015-0028-6, February 2015.

Non-Patent Literature 4: Y. Yamato, M. Muroi, K. Tanaka and M. Uchimura, "Development of Template Management Technology for Easy deployment of Virtual Resources on OpenStack", Journal of Cloud Computing, Springer, 2014, 3:7, DOI: 10.1196/s13677-014-0007-3, June 2014.

Non-Patent Literature 5: Y. Yamato, "Server Selection, Configuration and Reconfiguration Technology for IaaS Cloud with Multiple Server Types", Journal of Network and Systems Management, Springer, DOI: 10.1007/s10922-017-9418-z, August 2017.

SUMMARY OF THE INVENTION

Technical Problem

In recent years, as the term "cloud first" suggests, it has become common for applications to operate on operator facilities such as cloud systems. In doing so, users are demanding a low-cost and high-performance operation of applications. When applications are operated, the following considerations should be made as points that greatly affect the cost and performance of applications.

(1) First, it is conceivable to use accelerators such as GPUs and FPGAs if they are more effective in terms of performance and cost. Of course, it is not possible to use those accelerators with code designed for ordinary CPUs. Therefore, it is required to perform a code conversion to or make a library call to a code that off-loads processing suitable for GPUs and FPGAs, such as image processing and Fast Fourier Transform (FFT) processing, to the corresponding hardware. Code conversion is also necessary in the event of extracting control processing or the like of IoT devices and deploying the processing to a single board computer such as Raspberry Pi.

(2) Once the code of the application for operation is determined, it is necessary to determine the resource amount to be ensured. For example, in the case of an application operated on a CPU and a GPU, when the CPU processing takes 1000 seconds and the GPU processing takes 1 second, it is expected that the system will perform better if the CPU resources of the virtual machine are increased.

(3) The location where the application is executed also affects the performance. For example, when it is desired to analyze images of an IoT camera to search for a suspicious person within 0.5 seconds but the image analysis is performed after uploading the data to the cloud, the delay will be large. In view of this, it is necessary to analyze the images at a gateway that collects camera data or at an edge server that is an end point of the NW. That means, it is necessary to consider the processing location. In addition, even when the image analysis is performed at the edge server and the detailed images are sent to the cloud only if there is a suspicious person, the cost will also vary depending on the processing location as the amount of computation and communication traffic will vary.

(4) Even when the code conversion, resource amount adjustment, and deployment place adjustment have been finished according to the hardware and an operation of the application has been started, the initial performance may not be maintained when, for example, there is a significant change in the request characteristics during operation. In such cases, it is necessary to consider changing the configuration during operation to improve the performance and cost of the system.

The present invention has been made in view of the above-described points, and it is an object of the present invention to provide a software optimum deployment method of an off-load server and a program that can adapt an application according to an environment and can operate the application with high performance.

Means for Solving the Problem

To solve the above-mentioned problems, a first aspect of the present invention provides a method of optimal software deployment by an off-load server configured to off-load specific processing of an application to an accelerator. The method is executed by a processor of the off-load server and includes steps of: analyzing a source code of the application; designating off-loadable processes of the application, the off-loadable processes each including a loop statement that can be processed in parallel, a functional block of specific processing, or a library call; performing a code conversion according to a deployment destination environment; performing a verification environment performance measurement process including compiling the application to which the code conversion has been performed, deploying the compiled application to an accelerator verification device, and executing processing for measuring a performance of the application in the event of off-loading the off-loadable processes of the application to the accelerator verification device; repeating the steps of analyzing the source code of the application, designating the off-loadable processes of the application, performing the code conversion, and performing the verification environment performance measurement process; making a setting for resource amounts according to the deployment destination environment; selecting a deployment place by calculating a deployment destination on the basis of a performance and a cost when the converted code converted by the step of performing the code conversion is deployed while ensuring the resource amounts set by the step of making a setting for the resource amounts; after deployment to an actual environment, performing a performance measurement test process including compiling the application, deploying the compiled application to an operation device, and performing a measurement test for measuring an actual performance in the event of off-loading the application to the operation device; and after the step of performing the performance measurement test process, performing one or more of the step of performing the code conversion, the step of making the setting for resource amounts, the step of selecting the deployment place, the step of performing the verification environment performance measurement process, and the step of performing the performance measurement test process.

In this manner, for example, an application can be operated with high performance by adapting the application to the environment, and by appropriately utilizing GPUs and FPGAs in increasingly diversified environments including GPUs, FPGAs, and IoT devices. In addition, software that is described once can be operated with high performance also in different environments.

A second aspect of the present invention is the method according to the first aspect and further includes: performing an off-load pattern creation process including excluding loop statements causing a compilation error from loop statements to be off-loaded and creating a plurality of off-load processing patterns each of which specifies whether to perform off-load processing for each of the loop statements not causing a compilation error; and performing an execution file creation process including selecting an off-load pattern with a highest processing performance from the plurality off-load patterns on the basis of a result of performance measurements repeated for a predetermined number of times and compiling the off-load pattern with the highest processing performance to create an execution file. The step of designating the off-loadable processes of the application includes setting the number of the loop statements not causing a compilation error as a gene length according to a genetic algorithm. The step of performing the off-load pattern creation process includes preparing gene patterns whose number is specified as a number of individuals and whose gene values are each randomly assigned a value of 1 or 0 and accelerator processing availability is mapped to the gene patterns in such a manner that performing accelerator processing is assigned one of 1 and 0 and not performing acceleration processing is assigned the other of 1 and 0. The step of performing the verification environment performance measurement process includes: compiling, according to each of the individuals, an application code in which directives specifying parallel processes by the accelerator are specified; deploying the compiled application code to the accelerator verification device; and performing processing for measuring the performance of the individual on the accelerator verification device. The step of performing the execution file creation process includes: performing a performance measurement for all the individuals; evaluating the individuals in such a manner that an individual with less processing time is given a higher degree of fitness; selecting an individual having a degree of fitness higher than a predetermined value from all the individuals as an individual with a high performance; creating next-generation individuals by performing crossover and mutation processes on the selected individual; and after completing processing for a specified number of generations, selecting an off-load pattern with a highest performance as a solution.

In this manner, first, loop statements are checked for parallelizability, and then a performance verification trial is repeatedly performed using a genetic algorithm (GA) on the set of parallelizable iteration statements in a verification environment to search for appropriate areas. By narrowing down to parallelizable loop statements (e.g., for statements) and maintaining off-load patterns that may possibly achieve acceleration each in the form of parts of a gene and performing recombination on the off-load patterns, a pattern that achieves acceleration can be efficiently found from among an enormous number of available off-load patterns.

A third aspect of the present invention is the method according to the first aspect, in which the deployment destination environment includes a field programmable gate array (FPGA) as the accelerator and the step of designating the off-loadable processes of the application includes: identifying, from an application processing structure including functional block processing and library calls, the off-loadable processes which include functional block processing and library calls and which are off-loadable to the FPGA, with reference to a code pattern DB; and putting definition information of an intermediate language from the code pattern DB into an application source code by substitution, the definition information corresponding to a code for off-loading the off-loadable processes.

In this manner, it is possible to identify processing which includes a functional block processing or a library call and which is off-loadable to an FPGA and put it into the application source code by substitution.

A fourth aspect of the present invention is the method according to the first aspect, in which the step of making the setting for the resource amounts includes: determining, based on a processing time of an application test case, a resource ratio between a CPU and an off-load destination such that a processing time of the CPU and a processing time of the off-load destination are of equal orders; and, after determining the resource ratio, setting resource amounts such that processing performance of an assumed test case satisfies a required performance and a cost, while keeping the resource ratio.

In this manner, the resource amount can be set while satisfying the requested performance and cost by setting the resource ratio between the CPU and the off-load destination.

A fifth aspect of the present invention is the method according to the first aspect, in which the step of selecting the deployment place includes: calculating, based on a result of an application test case, an amount of calculation and an amount of traffic that would be generated in the event of deploying the application; modeling a relationship of links between devices including clouds, edges, and Home GWs; and under a constraint that a cost incurred when the application is deployed on a specific node satisfies a requirement, calculating either a deployment that maximizes the performance regarding the processing delay and/or the throughput or a deployment that minimizes the cost in such a manner that the performance satisfies the requested condition.

In this manner, it is possible to select a deployment place such that the performance regarding the processing delay and throughput is maximized or the cost is minimized while the performance satisfies the requirement.

A sixth aspect of the present invention is the method according to the first aspect and further includes: performing a reconfiguration reconfiguring software settings when an initially expected performance is not achieved after an operation of the application is started. The step of performing the reconfiguration includes constructing a reconfiguration destination and performing migration processing, to change software settings. The step of constructing the reconfiguration destination includes: making a trial calculation of the resource amounts setting and deployment place selection in a trial simulation, in a cyclic manner or when the performance is reduced to a threshold or less, to calculate a performance improvement and a degree of cost reduction;

and when there is a prospect of improvement in performance and cost through a change of the resource amounts and/or through a change of the deployment place, proposing a reconfiguration to the user; and upon approval from the user, changing a resource when performing the reconfiguration. The step of performing migration processing includes: creating a migration destination environment in the event of changing the deployment place; and performing migration of the application execution environment to the created environment from a migration source.

In this manner, it is possible to propose a reconfiguration to the user and, upon approval from the user, perform migration of the application execution environment.

A seventh aspect of the present invention is the method according to the first aspect, in which Yb the step of performing the reconfiguration includes: performing a trial simulation of code conversion processing in a cyclic manner or when the performance is reduced to the threshold value or less; proposing a reconfiguration to the user when there is a prospect of improvement in performance and cost by performing a code conversion to change a soft logic of GPU off-loading and/or to change a hard logic of a field programmable gate array (FPGA); and, upon approval from the user, changing the software logic of GPU off-loading in the event of performing the reconfiguration. When changing the software configuration, the step of performing migration processing includes migrating data of the application after creating the migration destination environment, in which an updated application is to be launched. When changing the hard logic of the FPGA, either: the step of performing migration processing includes preparing an FPGA whose hard logic has been configured in the migration destination and performing a migration of a container configured to control the FPGA; or the performing the reconfiguration includes reconfiguring the hard logic of the FPGA.

In this manner, it is possible to, when a reconfiguration is proposed to the user and upon approval from the user, perform migration of application data in the event of changing the software configuration and to prepare an FPGA whose hard logic has been configured and perform migration of a container or the like that controls the FPGA.

An eighth aspect of the present invention is a non-transitory computer-readable medium storing a computer program configured to cause the off-load server to execute the method according to the first aspect.

With this configuration, it is possible to cause a general computer to achieve the functions of the off-load servers according to the first to seventh aspect.

Effects of the Invention

According to the present invention, it is possible to provide a software optimum deployment method of an off-load server and a program that can adapt an application according to an environment and can operate the application with high performance.

DESCRIPTION OF EMBODIMENTS

Next, an off-load server 1 and the like in an embodiment (hereinafter referred to as "the present embodiment") of the present invention are described.

As used herein, the term "CPU-to-GPU data transfer" means a transfer of data from a CPU to a GPU.

As used herein, the term "GPU-to-CPU data transfer" means a transfer of data from a GPU to a CPU.

Figure 1:
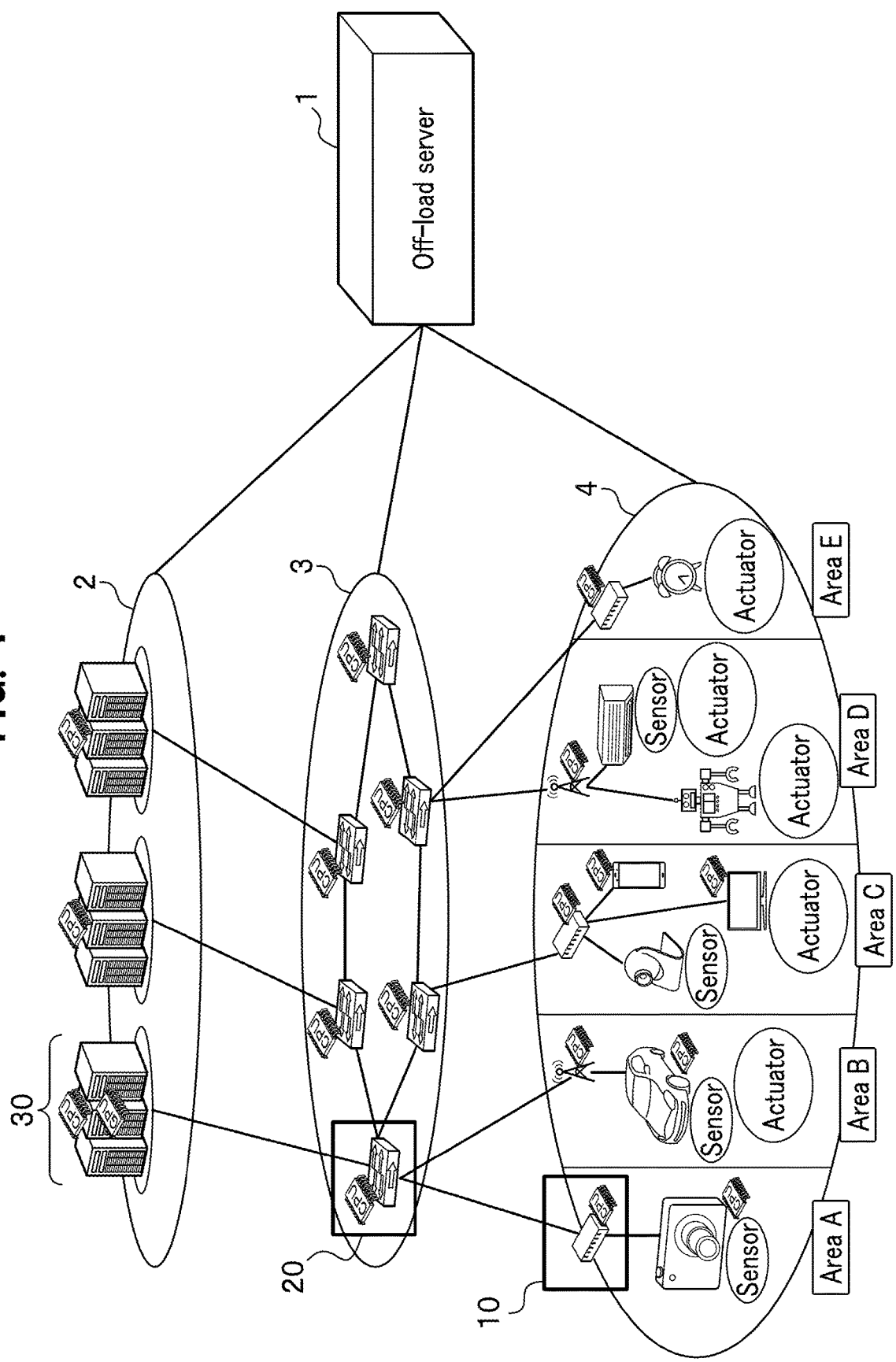
FIG. 1 is a diagram illustrating a system including an off-load server according to an embodiment of the present invention.

FIG. 1 illustrates a system including the off-load server 1 according to the present embodiment.

The system according to the present embodiment is characterized in including the off-load server 1. The off-load server 1 is an off-load server that off-loads specific processing of an application to an accelerator. In addition, the off-load server 1 is communicatively connected to devices located in three layers, namely, a cloud layer 2, a network layer 3, and a device layer 4. Data centers (DC) 30 are deployed in the cloud layer 2, network edges 20 are deployed in the network layer 3, and gateways 10 are deployed in the device layer 4.

In view of this, the system including the off-load server 1 according to the present embodiment achieves efficiency enhancement by appropriately performing function deployment and processing off-loading in each of the device layer 4, the network layer 3, and the cloud layer 2. Mainly, the system achieves: function deployment efficiency enhancement for deploying functions in appropriate places in three layers to perform processes; and efficiency enhancement by off-loading the functional processes, such as image analysis, to hetero hardware, such as GPUs and FPGAs. In the cloud layer, an increasing number of servers including heterogeneous HW (hardware) (hereinafter referred to as "hetero device") such as GPUs and FPGAs are used. For example, FPGAs are also used in Bing search provided by Microsoft (registered trademark). In this manner, performance enhancement is achieved by utilizing hetero devices by off-loading matrix calculation and the like to GPUs, and/or by off-loading specific processing such as fast Fourier transform (FFT) calculation to FPGAs, for example.

The following describes an exemplary configuration in which the off-load server 1 according to the present embodiment performs off-load processing in the background of user service usage.

Figure 2:
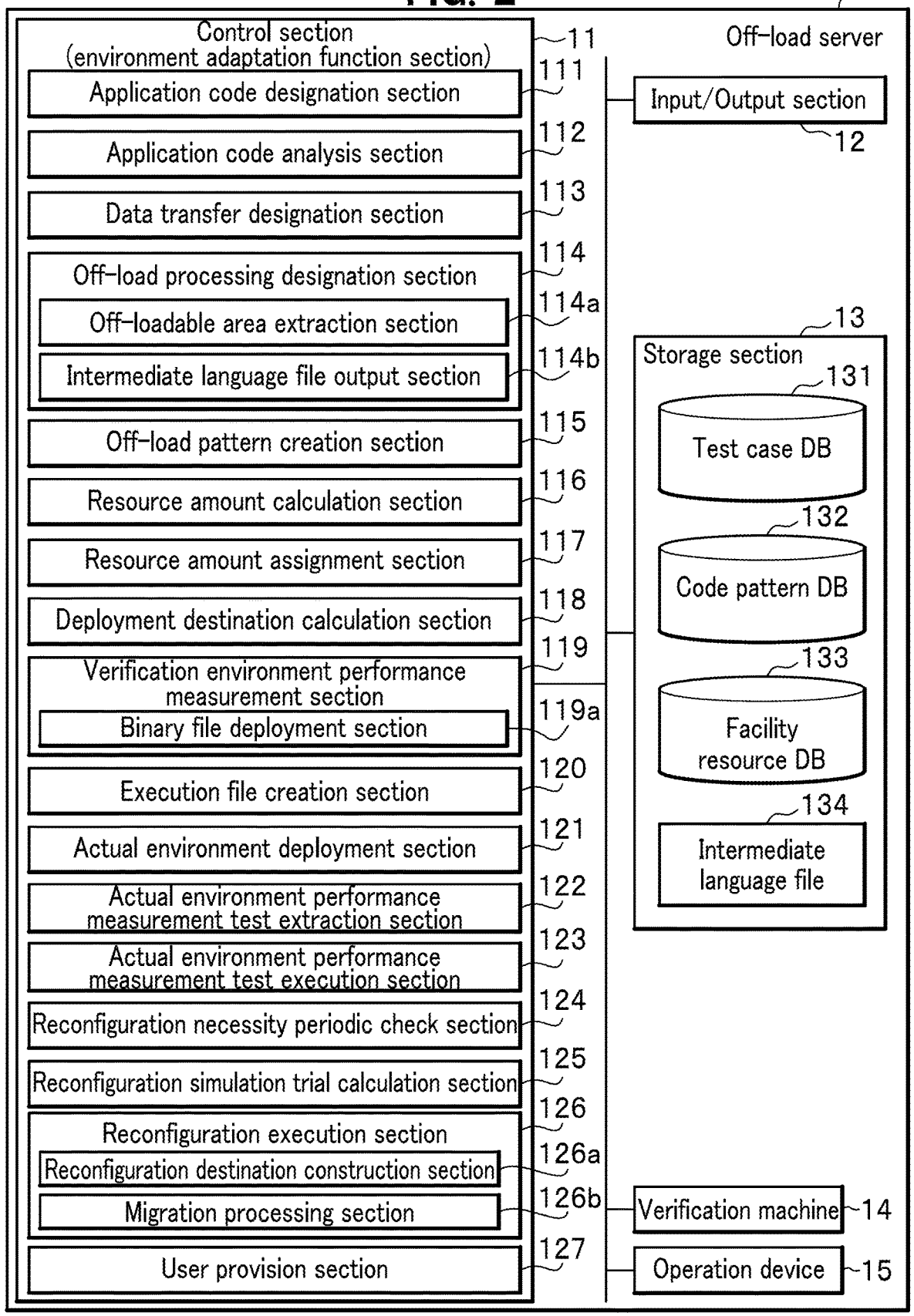
FIG. 2 is a functional block diagram illustrating an exemplary configuration of the off-load server according to the embodiment.

FIG. 2 is a functional block diagram illustrating an exemplary configuration of the off-load server 1 according to the embodiment of the present invention.

The off-load server 1 is a device that automatically off-loads specific processing of an application to an accelerator.

As illustrated in FIG. 2, the off-load server 1 includes a control section 11, an input/output section 12, a storage section 13, a verification machine 14 (accelerator verification device), and an operation device 15.

The input/output section 12 includes a communication interface for exchanging information with devices and the like belonging to the cloud layer 2, the network layer 3 and the device layer 4, an input device such as a touch panel and a keyboard, and an input/output interface for exchanging information with an output device such as a monitor.

The storage section 13 includes a hard disk, a flash memory, a random access memory (RAM), or the like.

The storage section 13 stores a test case database (DB) 131, a code pattern DB 132, and a facility resource DB 133, and temporarily stores programs (off-loading programs) for executing each function of the control section 11 and information (e.g., an intermediate language file 134) required for processing of the control section 11.

The test case DB 131 stores performance test items. The test case DB 131 stores data on prices (e.g., billing information on IoT services), performances (a calculation resource of an accelerator) and the like corresponding to performance test items.

Registered in the code pattern DB 132 includes codes that describe, in OpenCL and HDL, library calls to processes off-loadable to an FPGA, functional blocks off-loadable to an FPGA, and FPGA processing logics to be off-loaded.

The facility resource DB 133 accumulates resource information of facilities such as networks and computers. Resources of facilities such as networks and computers and the like can be allocated with reference to the facility resource DB 133. In addition, by considering resources such as a distributed system and a storage device as one resource by a virtualization technique, the resources can be allocated on demand when and as much as they are needed.

The verification machine 14 is a CPU-GPU-FPGA (accelerator)-IoT GW for verification environment. The verification machine 14 is used for a performance measurement in appropriate code pattern generation in a verification environment for a verification environment performance measurement section 119 described later.

Examples of the operation device 15 includes: a Home GW of a user's home as an actual environment; and an edge router connected thereto. The operation device 15 is used for a performance measurement for showing the actual performance by an actual environment performance measurement test execution section 123 described later after deployment to the actual environment.

Control Section 11

The control section 11 is an environment adaptation function section that controls the entire off-load server 1. The control section 11 is realized by a central processing unit (CPU) (not illustrated) loading a program (off-load program) stored in the storage section 13 into the RAM and executing it, for example.

The control section 11 includes an application code designation section (specify application code) 111, an application code analysis section (analyze application code) 112, a data transfer designation section 113, an off-load processing designation section 114, an off-load pattern creation section 115 (code conversion section), a resource amount calculation section 116 (resource amount setting section), a resource amount assignment section 117 (resource amount setting section), a deployment destination calculation section 118 (deployment place selection section), the verification environment performance measurement section 119, an execution file creation section 120, an actual environment deployment section (deploy final binary files to production environment) 121, an actual environment performance measurement test extraction execution section (extract performance test cases) 122, an actual environment performance measurement test execution section (run performance test cases automatically) 123, a reconfiguration necessity periodic check section 124, a reconfiguration simulation trial calculation section 125, a reconfiguration execution section 126, and a user provision section (provide price and performance to a user to judge) 127.

The control section 11 performs, as an environment adaptation function section, one or more of a code conversion step, a resource amount setting step, a deployment place selection step, a performance measurement step, and a performance measurement test step, which are described later.

Application Code Designation Section 111

The user designates an application code to be operated, test cases considered for utilization of the application code, and the desired performance and cost, to the application code designation section 111. The application code designation section 111 designates the input application code. More specifically, the application code designation section 111 identifies the processing function (such as image analysis) of the service provided to the user.

Application Code Analysis Section 112

The application code analysis section 112 executes an application code analysis step of analyzing an application code. The application code analysis section 112 analyzes the source code of the processing function to understand the code structure such as loop statements, reference relationships of variables, and functional blocks for processing (FFT: Fast Fourier Transform process).

Data Transfer Designation Section 113

The data transfer designation section 113 analyzes the reference relationships of the variables used in loop statements of the application, and, for data that can be transferred outside the loop, performs data transfer designation using an explicit instruction line (#pragma acc data copyin/copyout/copy (a[ . . . ]), where a is an variable) that explicitly specifies a data transfer outside the loop.

The data transfer designation section 113 performs data transfer specification using an explicit directive (#pragma acc data copyin (a[ . . . ])) that explicitly specifies a data transfer from a CPU to a GPU, an explicit instruction line (#pragma acc data copyout (a[ . . . ])) that explicitly specifies a data transfer from a GPU to a CPU, and an explicit instruction line (#pragma acc data copy (a[ . . . ])) that collectively and explicitly specifies a round-trip data copy for cases in which a variable is transferred from a CPU to a GPU and then transferred from the GPU to the CPU.

When a variable defined on the CPU program side is to be referenced by the GPU program side, the data transfer designation section 113 specifies a CPU-to-GPU data transfer at an outermost loop in which neither setting nor definition of the variable is included, among the loop of the loop statement to be processed by the GPU and the outer loops thereof.

When a variable set on the GPU program side is to be referenced by the CPU program side, the data transfer designation section 113 specifies a GPU-to-CPU data transfer at an outermost loop in which neither reference, setting, nor definition of the variable is included, among the loop of the loop statement to be processed by the GPU and the outer loops thereof.

Off-Load Processing Designation Section 114

The off-load processing designation section 114 performs an off-loadable process designation step that identifies off-loadable processes of the application, which off-loadable processes includes: loop statements (iteration statements), functional blocks of specific processing, and library calls, and, for each of the loop statements, specifies a directive specifying a parallel process by an accelerator and performs compilation.

Specifically, the off-load processing designation section 114 identifies, from an application processing structure including functional block processing and library calls, processes which include functional block processing and library calls and which are off-loadable to the FPGA, with reference to a code pattern DB 132; and puts definition information of an intermediate language corresponding to the off-loading from the code pattern DB into the application source code by substitution.

The off-load processing designation section 114 includes an off-loadable area extraction section (extract off-loadable area) 114a, and an intermediate language file output section (output intermediate file) 114b.

The off-loadable area extraction section 114a identifies processing off-loadable to a GPU or FPGA, examples of which processing include loop statements and FFT processing, and extracts an intermediate language according to the off-load processing. The off-loadable area extraction section 114a identifies the off-loadable processing of the application code with reference to the code pattern DB 132. Examples of the off-loadable processing include loop statements which can be processed in parallel, a functional block of an FFT processing, and library calls. The off-loadable area extraction section 114a then extracts an intermediate language (such as OpenCL) according to the off-load destination.

The intermediate language file output section 114b outputs the extracted intermediate language file 134. The intermediate language extraction is not ended at one time, but is repeated for optimization through execution trials to search for appropriate off-load areas. Note that the intermediate language extraction is not ended at one time, but is repeated for optimization through execution trials (e.g., 20 generations of a GA, 100 trials and the like) to search for appropriate off-load areas.

Off-Load Pattern Creation Section 115

The off-load pattern creation section 115 executes a code conversion step, which is a code conversion according to the deployment destination environment. According to the present embodiment, the off-load pattern creation section 115 executes an off-load pattern creation step that excludes loop statements (iteration statements) at which compilation errors occurs from those to be off-loaded and creates a plurality of off-load patterns each of which specifies whether to perform parallel processing for the iteration statements not causing a compilation error.

Resource Amount Calculation Section 116

The resource amount calculation section 116 sets a resource amount suitable to the deployment destination environment. Specifically, based on the processing time of an application test case, the resource amount calculation section 116 determines a resource ratio between the CPU and the off-load destination such that the processing time of the CPU and the processing time of the off-load destination are of equal orders. After determining the resource ratio, the resource amount calculation section 116 performs a resource amount setting step that, while keeping the resource ratio, makes a setting for resource amounts such that the processing performance in assumed test cases satisfies a required performance and cost.

Figure 4:
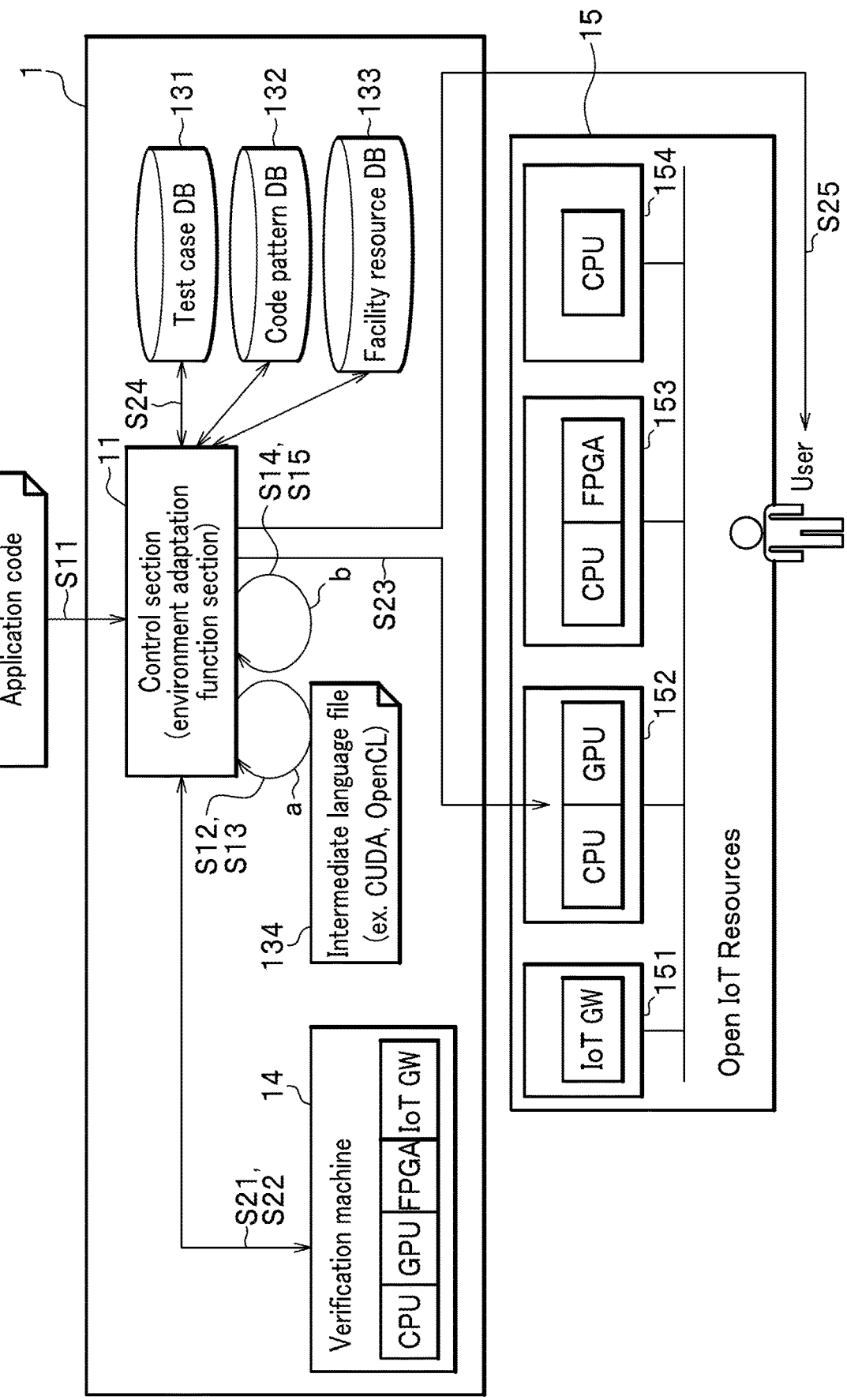
FIG. 4 is a diagram illustrating an automatic off-loading process using a GA of the off-load server according to the embodiment.

With reference to FIG. 4, a function of the resource amount calculation section 116 is described. After determining the code pattern at steps S21 and S22 in FIG. 4, the resource amount calculation section 116 determines appropriate resource amounts. Specifically, the resource amount calculation section 116 analyzes a processing time, in the processing time of an assumed test case, of a CPU and a processing time, in the processing time of the assumed test case, of hardware other than the CPU, such as a GPU, which are obtained in a verification environment performance measurement of steps S21 and S22 in FIG. 4, and determines an appropriate resource ratio. The above-described resource ratio is the ratio of resources to be ensured for the CPU and the hardware such as a GPU. An example of an appropriate resource ratio is vCPU core:virtual GPU=4:1. Next, the resource amount calculation section 116 determines, taking into account the performance and cost desired by the user and the appropriate resource ratio, resource amounts that are to be actually ensured. An example of the resource amounts that satisfy the performance and the cost is that the resource amount of vCPU core is "8" and the resource amount of the virtual GPU is "2".

In this manner, the resource amount calculation section 116 determines the resource ratio first, and then, taking the resource ratio into account, determines the resource amounts to be actually ensured. Thus, the resource ratio between the CPU and the off-load destination is determined and then the resource amounts can be set while satisfying the required performance and cost.

Resource Amount Assignment Section 117

The resource amount assignment section 117 specifies the resource amounts calculated by the resource amount calculation section 116 to the execution file.

Deployment Destination Calculation Section 118

The deployment destination calculation section 118 performs a deployment place selection step that, when a converted code converted by the off-load pattern creation section 115 is deployed with the resource amounts calculated by the resource amount calculation section 116 being ensured, calculates the deployment destination and selects the deployment place on the basis of the performance and the cost.

Specifically, the deployment destination calculation section 118 calculates, based on the result of application test cases, the amount of calculation and the amount of traffic that would be generated in the event of deploying the application, models a relationship of links between devices including clouds, edges, and Home GWs, and, under a constraint that a cost incurred when the application is deployed on a specific node satisfies a requirement, calculates, using linear programming, either a deployment that maximizes the performance regarding the processing delay and/or the throughput or a deployment that minimizes the cost in such a manner that the performance satisfies the requested condition.

With reference to FIG. 4, a function of the deployment destination calculation section 118 is described. When deploying the execution file of the code pattern (stored in the code pattern DB 132 of FIG. 2) determined at steps S21 and S22 in FIG. 4 while ensuring the resource amount determined at steps S14 and S15 in FIG. 4, the deployment destination calculation section 118 determines the deployment destination by calculating a place where an appropriate performance and cost are achieved. The deployment destination calculation section 118 calculates a deployment place where an appropriate performance and cost are achieved, based on the characteristics of the assumed test case of the application to be executed and on the information in the facility resource DB 133 (see FIG. 2).

For example, in a case in which it is desirable to perform a process of analyzing image information of an IoT camera to find a suspicious person with a delay of 0.5 sec or less, an edge server close to the IoT camera is identified and deployment is performed. Here, in the case where a required resource cannot be ensured at the desired deployment place due to a resource amount limitation, the process may be returned to step S14 in FIG. 4 to readjust the resource amount and/or to rearrange the place.

Verification Environment Performance Measurement Section 119

The verification environment performance measurement section 119 executes a verification environment performance measurement step, which compiles the application according to the off-load pattern, deploys the compiled application to the verification machine 14, and performs processing for measuring the performance in the event of off-loading the application to the accelerator.

The verification environment performance measurement section 119 includes a binary file deployment section 116a (deploy binary files). The binary file deployment section 119a deploys an execution file derived from the intermediate language to the verification machine 14, which is a verification environment provided with GPUs, FPGAs, and GWs for IoT devices.

The verification environment performance measurement section 119 uses the verification machine 14 in the verification environment (e.g., a laboratory of a communication carrier and the like) including GPUs and/or FPGAs to perform a performance measurement in the event of making a trial and error of GPU processing patterns of for statements.

Specifically, the verification environment performance measurement section 119 launches, for each of the plurality of off-load patterns, the deployed file to execute an assumed test case in order to measure the performance obtained when off-loading is performed and returns the result of the performance measurement to the off-loadable area extraction section 114a. Then, the off-loadable area extraction section 114a performs extraction of another off-load pattern. Then, the intermediate language file output section 114b performs performance measurements for trial using the extracted intermediate language (see reference character e in FIG. 4, which is described later).

The performance measurement in the above-described verification environment is repeated to determine the code pattern that is finally deployed.

Here, the code conversion step and the verification environment performance measurement step are repeated. The code conversion step is a code conversion performed by the off-load pattern creation section 115 according to the deployment destination environment. The verification environment performance measurement step is performed for the case where the verification environment performance measurement section 119 compiles the application on which the code conversion has been performed and deploys the compiled application to the verification machine 14 to off-load the application to the accelerator. That is, the verification environment performance measurement is repeated with the code conversion.

Execution File Creation Section 120

The execution file creation section 120 performs an execution file creation step that selects an off-load pattern with a highest processing performance from a plurality of off-load patterns on the basis of the result of the performance measurement repeated for a predetermined number of times and uses the off-load pattern with the highest processing performance to create an execution file.

Actual Environment Deployment Section 121

The actual environment deployment section 121 deploys the created execution file to the actual environment for the user ("deployment of final binary file to actual environment"). The actual environment deployment section 121 performs an actual environment deployment step that determines a pattern indicative of the final off-load areas and deploys the execution file corresponding to the pattern to the actual environment for the user.

Actual Environment Performance Measurement Test Extraction Section 122

After the execution file is deployed, an actual environment performance measurement test extraction section 122 extracts performance test items from the test case DB 131 ("deployment of final binary file to actual environment").

Actual Environment Performance Measurement Test Execution Section 123

After the execution file is deployed, the actual environment performance measurement test execution section 123 performs, by using the operation device 15, an automatic execution of the performance test items extracted by the actual environment performance measurement test extraction section 122 for indication of the performance to the user ("deployment of final binary file to actual environment"). Here, the operation device 15 is a Home GW of a user's home, an edge router connected thereto, and the like as an actual environment. After the execution file is deployed to the actual environment (a Home GW of a user's home, an edge router connected thereto and the like), the actual environment performance measurement test execution section 123 performs a performance measurement and shows the result of the performance measurement to the user.

With reference to FIG. 4, a function of the actual environment performance measurement test extraction section 122 is described. The actual environment performance measurement test extraction section 122 verifies whether an expected operation is achieved when the execution file corresponding to the code pattern determined at steps S21 and S22 in FIG. 4 is deployed at a commercial environment deployment place determined at step S15 in FIG. 4 while ensuring the resource amount determined at step S14 in FIG. 4. Specifically, the actual environment performance measurement test extraction section 122 verifies the operation by using assumed test cases specified by the user and/or application regression test cases held in the test case DB 131. At this time, the actual performance of the assumed test case in the commercial environment, including the specs and the costs of all of the ensured resources, is presented to the user to let the user determine whether to start the service, and in the case of OK, the operation of the application is started.

Reconfiguration Necessity Periodic Check Section 124

The reconfiguration necessity periodic check section 124 periodically checks the necessity of reconfiguration.

Reconfiguration Simulation Trial Calculation Section 125

When reconfiguration is required, the reconfiguration simulation trial calculation section 125 conducts a simulation trial calculation for the reconfiguration.

With reference to FIG. 4, a function of the reconfiguration simulation trial calculation section 125 is described. When an initially expected performance is not achieved in the application operation started at step S23 in FIG. 4 due to a change or the like in the request characteristics, the reconfiguration simulation trial calculation section 125 reconfigures the software setting and the software/hardware configuration. The reconfiguration of software setting means re-changing the resource amount and/or the deployment place. Examples of the reconfiguration of software setting include: changing the resource ratio when the processing time balance between a CPU and a GPU is poor, increasing the amount of the resources while keeping the ratio of the resources when the response time is increasingly degraded due to an increase in the request amount, and changing the deployment place to another cloud in such situations. The reconfiguration of software/hardware configuration means a reconfiguration starting from a code conversion, and means, in the case of a GPU, changing the logic for off-load processing, and, in the case where a hardware logic is changeable during operation such as in the case of an FPGA, means reconfiguring the hardware logic. An example of the latter case is that, when both an SQL DB and a No SQL DB are operated and the number of SQL requests is originally large and the number of No SQL requests is increased more than a certain value, the FPGA is reconfigured to accelerate No SQL.

The processing flow of collectively performing the code conversion, the resource amount adjustment, the deployment place adjustment, and the reconfiguration during operation, which are required for environment adaptation and to be performed at step S25 in FIG. 4, has been described. However, it should be noted that it is also possible to extract only a process desired to be performed. For example, when only a code conversion is desired to be performed for a GPU, only the steps S11 to S13 in FIG. 4 may be performed and only required parts such as the environment adaptation function section 11 and the verification environment may be used.

Reconfiguration Execution Section 126

When an initially expected performance is not achieved after the operation of the application is started, the reconfiguration execution section 126 reconfigures the software setting.

The reconfiguration execution section 126 includes a reconfiguration destination construction section 126a and a migration processing section 126b.

The reconfiguration destination construction section 126a performs, in changing the software setting, a reconfiguration destination construction step that makes a trial calculation of the resource amount setting and deployment place selection in a trial simulation, in a cyclic manner or when the performance is reduced to a threshold or less, to calculate the performance improvement and the degree of cost reduction. Then, when there is a prospect of improvement in performance and cost through a change of the resource amount and/or through a change of the deployment place, the reconfiguration destination construction step proposes a reconfiguration to the user, and, upon approval from the user, changes the resources when performing the reconfiguration.

When changing the deployment place, the migration processing section 126b performs a migration processing step that creates a replicated migration destination environment and performs migration of the application execution environment thereto from the migration source.

The reconfiguration execution section 126 performs a trial simulation of a code conversion process in a cyclic manner or when the performance is reduced to a threshold value or less. When there is a prospect of improvement in performance and cost by performing a code conversion to change the soft logic of GPU off-loading and/or to change a hard logic of the FPGA, the reconfiguration execution section 126 proposes a reconfiguration to the user, and, upon approval from the user, changes the soft logic of GPU off-loading when performing the reconfiguration.

When changing the software configuration, the migration processing section 126b creates a replicated environment in which the updated execution file is to be launched and performs migration of the data of the application. When changing the hard logic of the FPGA, the migration processing section 126b prepares an FPGA whose hard logic has been configured in the migration destination and performs migration of a container or the like that controls the FPGA. Alternatively, the reconfiguration execution section 126 reconfigures the hard logic of the FPGA.

User Provision Section 127

The user provision section 127 presents, to the user, information on the price, performance and the like based on the result of the performance test ("provision of information on price, performance and the like to user"). In the test case DB 131, data on the price, performance and the like corresponding to performance test items is stored. The user provision section 127 reads out the data on the price, performance and the like corresponding to the test items stored in the test case DB 131, and presents the data to the user together with the above-described result of the performance test. On the basis of the presented information on the price, performance and the like, the user determines whether to start using the IoT service with billing. Here, the known technique disclosed in Non-Patent Literature 3 may be used for the collective deployment to the actual environment, and the known technique disclosed in Non-Patent Literature 4 may be used for the automatic performance test.

Performance Measurement

As described above, the performance measurements to be performed by the control section 11 (environment adaptation function section) are classified into two types.

(1) A Performance Measurement in the Event of Generating an Appropriate Code Pattern in a Verification Environment A performance measurement in the event of doing a trial and error on a GPU processing pattern of for statements in a verification environment (a laboratory or the like of a communication carrier) including GPU(s) and/or FPGA(s). According to the present embodiment, the verification environment performance measurement section 119 performs the performance measurement using the verification machine 14.

(2) A Performance Measurement for Showing the Actual Performance after Deployment to an Actual Environment After the execution file is deployed to an actual environment (an HGW in the user's home, an edge router connected thereto and the like), the performance is measured and the result is shown to the user. According to the present embodiment, after the execution file is deployed, the actual environment performance measurement test extraction section 122 extracts the performance test items from the test case DB 131, and the actual environment performance measurement test execution section 123 performs the performance test items using the operation device 15.

Application of Genetic Algorithm

The off-load server 1 may use a GA for optimization of off-loading. A configuration of the off-load server 1 using the GA is as described below.

Specifically, the off-load processing designation section 114 uses the number of loop statements (iteration statements) not causing a compilation error as the gene length, according to a genetic algorithm. The off-load pattern creation section 115 maps accelerator processing availability to a gene pattern in such a manner that performing accelerator processing is assigned either 1 or 0 and not performing accelerator processing is assigned either the opposite 0 or 1.

The off-load pattern creation section 115 prepares gene patterns whose number is specified as the number of individuals such that values of genes are randomly set as either 1 or 0. The verification environment performance measurement section 119 compiles, according to each individual, an application code in which directives specifying parallel processes by accelerators are specified and deploys the compiled code to the verification machine 14. The verification environment performance measurement section 119 performs processing for measuring the performance on the verification machine 14.

When a gene of an off-load pattern which is the same as before is generated in an intermediate generation, the verification environment performance measurement section 119 does not perform compilation of the application code corresponding to the off-load pattern and does not perform performance measurement and uses the same performance measurement value.

In addition, for an application code that causes a compilation error and an application code with which the performance measurement does not finish within a predetermined time, the verification environment performance measurement section 119 handles these cases as time-out cases and sets the performance measurement value to a predetermined time (a long time).

The execution file creation section 120 performs the performance measurement for all the individuals and evaluates them in such a manner that an individual with a shorter processing time is considered as having a higher degree of fitness. The execution file creation section 120 selects, from all the individuals, individuals having degrees of fitness higher than a predetermined value (e.g., top n percent of all the individuals or top m individuals, where n and m are natural numbers) as individuals with high performance and performs crossover and mutation processes to the selected individual to create individuals of the next generation. After processing for a specified number of generations has been completed, the execution file creation section 120 selects an off-load pattern having a highest performance as the solution.

A software optimum deployment method of the off-load server 1 having the above-described configuration is described below.

Optimum Deployment Operation

Figure 3:
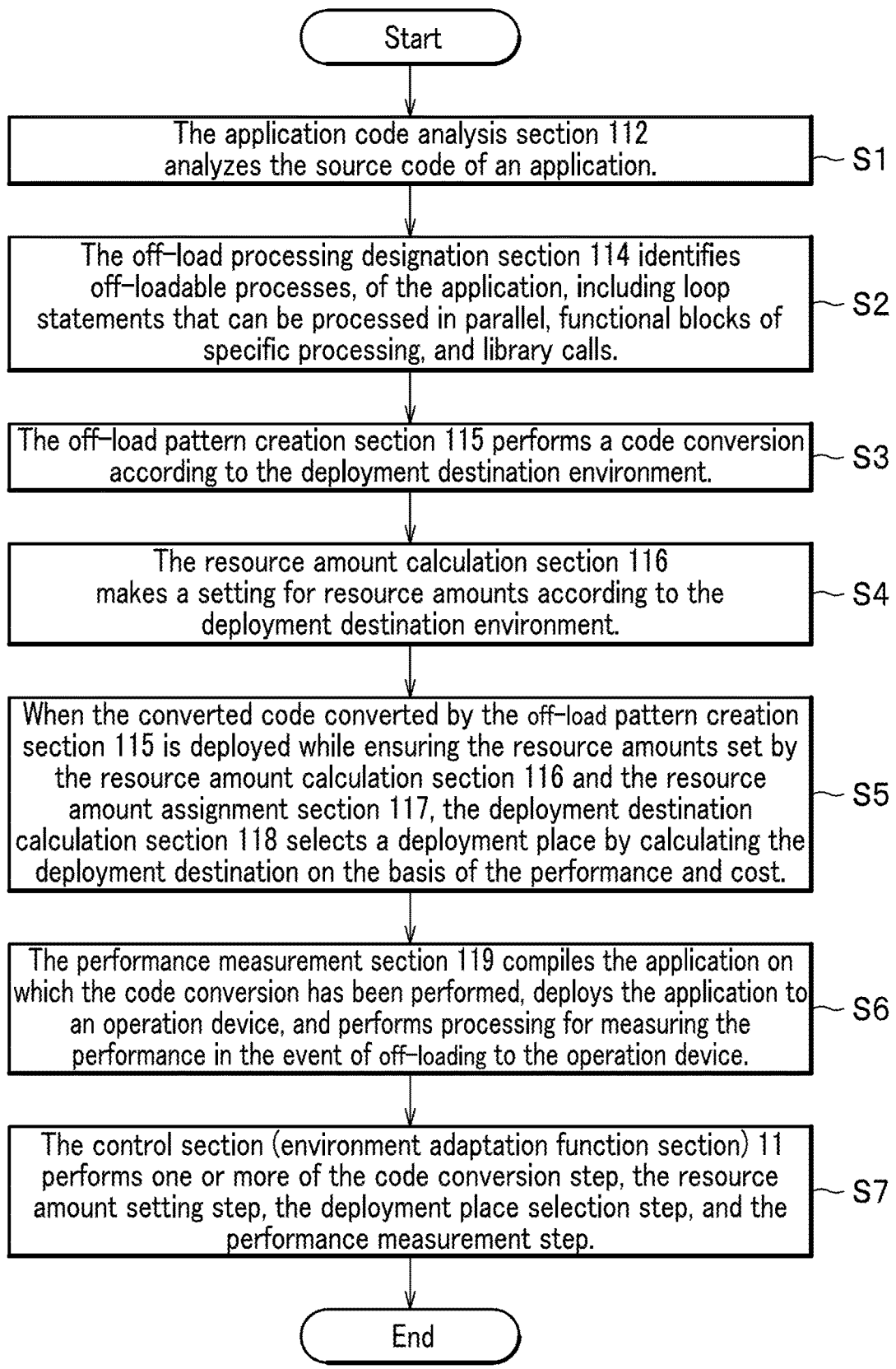
FIG. 3 is a flowchart of a software optimum deployment process of the off-load server according to the embodiment.

FIG. 3 is a flowchart of a software optimum deployment process of the off-load server 1.

At step S1, the application code analysis section 112 of the control section 11 analyzes a source code of a processing function of an application to determine code structures such as loop statements, reference relationships of variables, and functional blocks for processing.

At step S2, the off-load processing designation section 114 identifies off-loadable processes of the application, which off-loadable processes include loop statements that can be processed in parallel, functional blocks of specific processing, and library calls. For each loop statement, the off-load processing designation section 114 specifies a directive specifying a parallel process by the accelerator, and performs compilation.

At step S3, the off-load pattern creation section 115 performs a code conversion according to the deployment destination environment.

At step S4, the resource amount calculation section 116 makes a setting for resource amounts according to the deployment destination environment. Based on the processing times of the application test cases, the resource amount calculation section 116 determines a resource ratio between the CPU and the off-load destination such that the processing time of the CPU and the processing time of the off-load destination are of equal order, and, after determining the resource ratio, sets the resource amounts while keeping the resource ratio such that the processing performance for the assumed test cases satisfies a required performance and cost.

At step S5, when the converted code converted by the off-load pattern creation section 115 is deployed while ensuring the resource amounts set by the resource amount calculation section 116 and the resource amount assignment section 117, the deployment destination calculation section 118 selects a deployment place by calculating the deployment destination on the basis of the performance and the cost. Specifically, the deployment destination calculation section 118 calculates, based on the result of application test cases, the amount of calculation and the amount of traffic that would be generated in the event of deploying the application, models a relationship of links between devices including clouds, edges, and Home GWs, and, under a constraint that a cost incurred when the application is deployed on a specific node satisfies a requirement, calculates, using an optimization method (e.g., linear programming), either a deployment that maximizes the performance regarding the processing delay and/or the throughput or a deployment that minimizes the cost in such a manner that the performance satisfies the requested condition.

At step S6, the verification environment performance measurement section 119 compiles, for each of the plurality of off-load patterns, the application on which the code conversion has been performed, deploys the application to the verification machine 14, and performs processing for measuring the performance in the event of off-loading the processes corresponding to the off-load pattern to the accelerator.

At step S7, the control section (environment adaptation function section) 11 performs an environment adaptation process that performs one or more of the code conversion step, the resource amount setting step, the deployment place selection step, and the performance measurement step, and terminates the processing of this flow.

Automatic Off-Load Operation

The following describes an example in which the off-load server 1 of the present embodiment is applied to a GPU automatic off-load technique of a user application logic.

FIG. 4 is a diagram illustrating an automatic off-loading process using a GA of the off-load server 1.

As illustrated in FIG. 4, the off-load server 1 includes the control section (environment adaptation function section) 11, the test case DB 131, the code pattern DB 132, the facility resource DB 133, the intermediate language file 134, and the verification machine 14.

The off-load server 1 retrieves an application code 130 used by the user.

The user uses an Open IoT resource 15. The Open IoT resource 15 is, for example, various types of devices including an IoT GW 151, a CPU-GPU-equipped device 152, a CPU-FPGA-equipped device 153, and a CPU-equipped device 154. The off-load server 1 automatically off-loads functional processes to the accelerators of the CPU-GPU-equipped device 152 and the CPU-FPGA-equipped device 153.

An operation of each section is described with reference to the step numerals in FIG. 4.

Step S11: Specify Application Code

At step S11, the application code designation section 111 (see FIG. 2) identifies the processing function (such as image analysis) of the service provided to the user. More specifically, the application code designation section 111 designates the input application code.

Step S12: Analyze Application Code

At step S12, the application code analysis section 112 (see FIG. 2) analyzes the source code of the processing function to understand the structures such as loop statements and calls to an FFT library.

Step S13: Extract Off-Loadable Area

At step S13, the off-load processing designation section 114 (see FIG. 2) identifies loop statements (iteration statements) of the application and, for each of the iteration statements, specifies a directive specifying a parallel process by an accelerator and performs compilation. More specifically, the off-loadable area extraction section 114a (see FIG. 2) identifies processes off-loadable to a GPU and/or an FPGA, such as loop statements and FFT processing, and extracts an intermediate language according to the off-load processing.

Step S14: Output Intermediate File

At step S14, the intermediate language file output section 114b (see FIG. 2) outputs the intermediate language file 134. The extraction of intermediate language is not finished by one time, but is repeated for optimization by performing the execution for trial, in order to search for appropriate off-load areas.

Step S15: Create Off-Load Patterns

At step S15, the off-load pattern creation section 115 (see FIG. 2) excludes loop statements causing a compilation error from those to be off-loaded and creates a plurality of off-load patterns each of which specifies whether to perform parallel processing for each of the iteration statements not causing a compilation error.

Step S21: Deploy Binary Files

At step S21, the binary file deployment section 119a (see FIG. 2) deploys an execution file derived from an intermediate language corresponding to an off-load pattern to the verification machine 14 including a GPU, an FPGA, and an IoT GW.

Step S22: Measure Performances

At step S22, the verification environment performance measurement section 119 (see FIG. 2) executes the deployed file to measure the performance in the event of performing off-load processing on the deployed file.

To find more appropriate areas to be off-loaded, the result of the performance measurement is returned to the off-loadable area extraction section 114a. Then, the off-loadable area extraction section 114a extracts another pattern. Then, the intermediate language file output section 114b executes a performance measurement for trial using the extracted intermediate language (see reference character a in FIG. 4).

As indicated by the reference characters a and b of FIG. 4, the control section 11 repeatedly executes the above-described steps from step S12 to step S22. In summary, the automatic off-load function of the control section 11 is as follows. Specifically, the off-load processing designation section 114 identifies loop statements (iteration statements) of the application and, for each iteration statement, specifies a directive specifying a parallel process by the GPU and performs compilation. Then, the off-load pattern creation section 115 excludes loop statements causing a compilation error from those to be off-loaded and creates a plurality of off-load patterns each of which specifies whether to perform parallel processing for each of the loop statements not causing a compilation error. Then, for each of the plurality of off-load patterns, the binary file deployment section 119a compiles the application according to the off-load pattern and deploys the compiled application to the verification machine 14 and the verification environment performance measurement section 119 performs processing for measuring the performance on the verification machine 14. The execution file creation section 120 selects an off-load pattern with the highest processing performance from all the off-load patterns subjected to the performance measurement on the basis of the result of the performance measurement repeated for a predetermined number of times and compiles the selected pattern to create an execution file.

Step S23: Deploy Final Binary Files to Production Environment

At step S23, the actual environment deployment section 121 determines a pattern that designates the final off-load areas, and deploys the pattern to the actual environment for the user.

Step S24: Extract performance test cases and run automatically

At step S24, after the execution file is deployed, the actual environment performance measurement test extraction section 122 extracts performance test items from the test case DB 131, and performs an automatic execution of the extracted performance test in order to indicate the performance to the user.

Step S25: Provide Price and Performance to a User to Judge

At step S25, the user provision section 127 presents, to the user, information on the price, performance and the like based on the result of the performance test. On the basis of the presented information on the price, performance and the like, the user determines whether to start using the IoT service with billing.

The above-described steps from step S11 to step S25 are performed in the background of IoT service use of the user, and are assumed to be performed during the first day of a temporary use, for example. In addition, to reduce the cost, processing that is performed in the background may be limited to optimization of function deployment and to off-loading to a GPU and/or an FPGA.

As described above, the control section (environment adaptation function section) 11 of the off-load server 1 extracts the areas to be off-loaded from the source code of the application to be used by the user and outputs an intermediate language, in order to off-load functional processes (steps S11 to S15). The control section 11 deploys the execution file derived from the intermediate language to the verification machine 14 and causes the verification machine 14 to execute the execution file to verify the effect of off-loading (steps S21 to S22). The control section 11 repeats the verification, then determines appropriate off-load areas, and then deploys the execution file to an actual environment that is actually provided to the user, to provide the execution file as a service (steps S23 to S25).

GPU Automatic Off-Load Using GA

The GPU automatic off-loading is a process in which step S12 to step S22 of FIG. 4 are repeated on a GPU to obtain an off-loading code that is finally deployed at step S23.

In general, a GPU is a device that does not guarantee latency, but is suitable for increasing the throughput through a parallel process. Various applications for IoT operations are available. Representative examples thereof include encryption of IoT data, image processing for camera image analysis, and machine learning processing for analysis of a large amount of sensor data, which entail repetitive processing. In view of this, it is aimed to achieve acceleration through automatic off-loading of iteration statements of an application to a GPU.

However, as described in the description of conventional art, appropriate parallel processing is required for acceleration. In particular in the case where a GPU is used, due to memory transfer between the CPU and the GPU, good performance often cannot be achieved unless the data size is large and/or the number of loops is large. In addition, depending on the timing of memory data transfer, some combinations of loop statements (iteration statements) that can be processed in parallel for acceleration may not be the fastest. For example, even though the GPU can achieve acceleration for the first, fifth, and tenth statements of ten for statements (iteration statements) than the CPU, the combination of the first, fifth, and tenth statements may not be a highest speed option.

To designate appropriate parallel areas, attempts are being made to optimize parallelizability of for statements through a trial and error process using a PGI compiler. However, the trial and error process takes a lot of uptime, and as such, when it is provided as an IoT service, it disadvantageously takes a long time until the user can start to use it and increases cost.

In view of this, the present embodiment automatically extracts appropriate off-load areas from a general-purpose program that does not assume parallelization. For this purpose, the embodiment first checks if for statements can be parallelized and, for a set of for statements that can be parallelized, performs a performance verification trial repeatedly on a verification environment using GA to find appropriate areas. By narrowing down to the for statements that can be parallelized and holding and recombining an off-load pattern that may possibly achieve acceleration in a form of a part of gene, a pattern that achieves acceleration can be efficiently found from an enormous number of off-load patterns that can be made.

Figure 5:
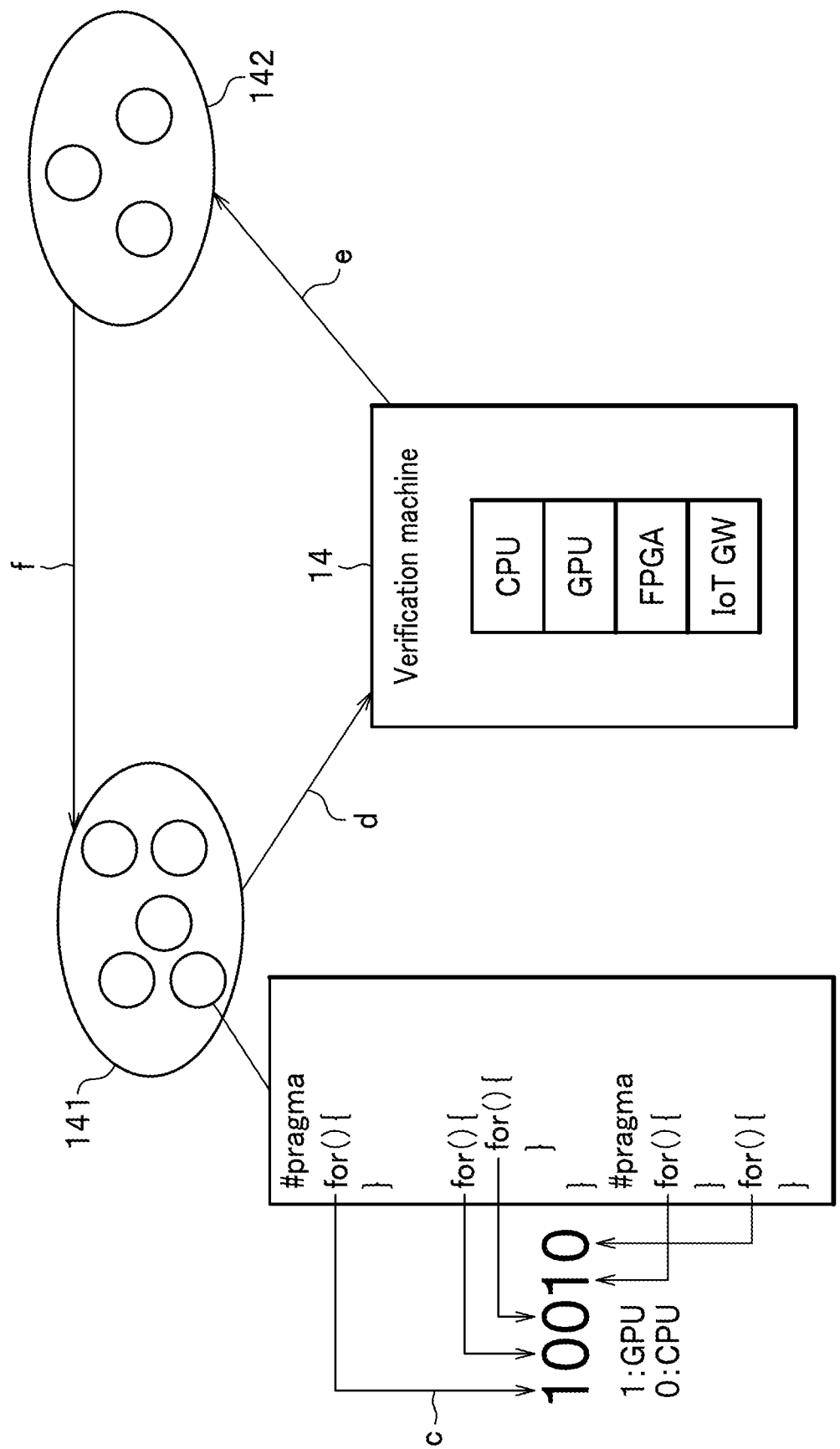
FIG. 5 is a diagram illustrating an image of a find process by a control section (environment adaptation function section) using Simple GA of the off-load server according to the embodiment.

Image of Finding by Control Section (Environment Adaptation Function Section) 11 Using Simple GA FIG. 5 is a diagram illustrating an image of a find process by Simple GA of the control section (environment adaptation function section) 11. FIG. 5 illustrates the find process image and illustrates gene sequence mapping of for statements.

GA is one of combinatorial optimization methods that imitate the evolutionary process of living things. The flowchart of GA includes initialization, evaluation, selection, crossover, mutation, and termination determination in this order.

In the present embodiment, Simple GA, which is a simplified version of GA, is used. Simple GA is a GA simplified in such a manner that a gene is of only 1s and 0s, roulette wheel selection and single-point crossover are employed, and mutation is performed by reversing the value of one point of the gene.

Initialization

In the initialization process, the parallelizability of all the for statements in the application code is checked and then the for statements that can be parallelized are mapped to a gene sequence. The for statements to be processed by a GPU are assigned a value of 1 and the for statements not to be processed by the GPU are assigned a value of 0. The genes are prepared for a specified M number of individuals in such a manner that one for statement is assigned a value of 1 or 0 randomly.

Specifically, the control section (environment adaptation function section) 11 (see FIG. 2) retrieves the application code 130 (see FIG. 4) used by the user, and checks the parallelizability of the for statements on the basis of the code patterns 141 of the application code 130 as illustrated in FIG. 5. As illustrated in FIG. 5, when five for statements are found in the code pattern 141 (see reference character c in FIG. 5), one digit of 1 or 0 is randomly assigned for each for statement, and here, five digits of 1 or 0 is assigned to the five for statements. For example, a value of 0 is assigned for the cases in which the processing is performed by the CPU, and a value of 1 is assigned for the cases in which processing is outsourced to the GPU. It should be noted that in this phase, a value of 1 or 0 is randomly assigned.

The code corresponding to the gene is five digits. Five-digit gene sequence code has 32 ($=2^5$) patterns, including 10001, 10010, . . . . Note that in FIG. 5, the circles in the code pattern 141 are illustrated as an image of the code.

Evaluation

In the evaluation process, deployment and performance measurement are performed (see the reference character d in FIG. 5). Specifically, the verification environment performance measurement section 119 (see FIG. 2) compiles a code corresponding to the gene, deploys the compiled code to the verification machine 14, and executes the deployed code. The verification environment performance measurement section 119 performs a benchmark performance measurement. A gene corresponding to a pattern (off-load pattern) with good performance is given a higher degree of fitness.

Selection

In the selection process, on the basis of the degree of fitness, high performance code patterns are selected (see the reference sign e in FIG. 5). The verification environment performance measurement section 119 (see FIG. 2) selects genes which are given with a high degree of fitness and whose number is specified as the number of the individuals, on the basis of the degree of fitness. The present embodiment performs roulette-wheel selection according to the degree of fitness and elite selection of selecting the gene with the highest degree of fitness.

FIG. 5 illustrates that, as an image of the find process, the number of the circles has reduced to three in the selected code patterns 142.

Crossover

In the crossover process, genes are partially swapped at one point between selected individuals at a certain crossover ratio Pc to create offspring individuals.

Crossover of genes is performed between a certain pattern (off-load pattern) and another pattern obtained by the roulette-wheel selection. The position of the single-point crossover is arbitrarily selected. For example, crossover processing is performed at the third digit in the above-described five-digit code.

Mutation

In the mutation process, each value of the genes of the individuals is changed from 0 to 1 or from 1 to 0 at a certain mutation ratio Pm.

In addition, the mutation process is adopted to avoid a localized solution. Note that the mutation process may not be performed for the purpose of reducing the calculation amount.

Termination Determination

As illustrated in FIG. 5, next-generation code patterns are generated after the crossover and mutation processes (see reference character f in FIG. 5).

In the termination determination, the process is terminated after iterations for a specified T number of generations, then, a gene with the highest degree of fitness is selected as the solution.

For example, fast three patterns, 10010, 01001 and 00101 are selected through performance measurement. With the three, recombination is performed using a GA for the next generation to create a new pattern (off-load pattern), for example, 10101 (an example). In this event, an arbitrary mutation, such as a change from 0 to 1, is caused in the recombined patterns. The above-described processing is repeated to find a fastest pattern. By setting specified generations (e.g., 20 generations) and the like, a pattern remaining in the last generation is used as the final solution.

Deployment

With an off-load pattern with the highest processing performance, which corresponds to the gene with the highest degree of fitness, the deployment to the actual environment is performed anew to provide it to the user.

Supplementary Explanation

The following describes a case where there is a fair number for statements (loop statements; iteration statements) that cannot be off-loaded to a GPU. For example, even when there is 200 for statements, only about 30 of them can be off-loaded to a GPU. Here, the statements that cause errors are excluded and a GA is performed for the 30 statements.

OpenACC provides a compiler that allows specifying "#pragma acc kernels" directives to extract bytecode for GPU and to perform GPU off-loading by executing the bytecode. By writing a command for a for statement in this #pragma, it is possible to determine whether the for statement can operate on the GPU.

For example, when C/C++ is used, the C/C++ code is analyzed to find out for statements. When a for statement is found, a statement is written for the for statement using "#pragma acc kernels", which is a syntax defined in OpenACC for parallel processing. Specifically, for statements are inserted into an empty "#pragma acc kernels" one by one and compiled. Then, if an error occurs for a for statement, that for statement cannot be processed by the GPU in the first place and thus is excluded. In this manner, remaining for statements are found. Then, the number of statements that do not cause errors are used as the length (gene length). When the number of for statements that do not cause errors is five, the gene length is five, and when the number of for statements that do not cause errors is ten, the gene length is ten. Note that one that cannot be processed in parallel is a case with a data dependency in which a previous processing is used for the next processing.

The preparation phase is as described above. Next, GA processing is performed.

A code pattern having a gene length corresponding to the number of for statements has been obtained. Initially, off-load patterns 10010, 01001, 00101, . . . are randomly allocated. GA processing is performed, and compilation is performed. Then, errors may occur in some situation even with an off-loadable for statement. Such a situation occurs with hierarchical for statements (which can be processed by a GPU by specifying either of them). In this case, the for statement that caused an error may be left. Specifically, it is conceivable to generate a timeout masqueraded as being caused due to an increased processing time.

The off-load patterns are deployed to the verification machine 14 to be subjected to a benchmark testing. That is, for example, when the processing to be off-loaded is image processing, the image processing is subjected to the benchmark testing. The shorter the time consumed in the processing, the off-loading pattern is evaluated as having a higher degree of fitness. For example, the evaluation is given as an inverse of the processing time. A value of 1 is given to processing that takes 10 seconds; a value of 0.1 is given to processing that takes 100 seconds; and a value of 10 is given to processing that takes 1 second.

Off-load patterns with a high degree of adaptation are selected. For example, 3 to 5 off-load patterns are selected from 10 off-loading patterns. Then, the selected off-loading patterns are recombined to create new code patterns. In the course of the creation, the pattern same as before may be created in some situation. In this case, the same data as before is used because it is not necessary to perform the same benchmark testing. The present embodiment stores the code patterns and the processing times thereof in the storage section 13.

A description has been given of an image of the find process using Simple GA of the control section (environment adaptation function section) 11. Next, a collective processing method for data transfer is described.

Collective Processing Method for Data Transfer

As described above, a genetic algorithm is used to automatically tune parallel processing parts that can be effectively processed by GPU processing. However, depending on the data transfer between CPU and GPU memories, some applications cannot be improved in performance. For this reason, it is difficult for an unskilled user to improve the performance of applications using GPUs. In addition, even when using an automatic parallelization technique, try-and-error operations are necessary to check parallelizability, and there are cases in which acceleration is not possible.

In view of this, the present embodiment provides a technique by which as many application as possible can be automatically improved in performance using GPUs and the number of data transfers to GPUs can be reduced.

Next, a collective processing method for data transfer by the off-load server 1 of the present embodiment is described.

Figure 6:
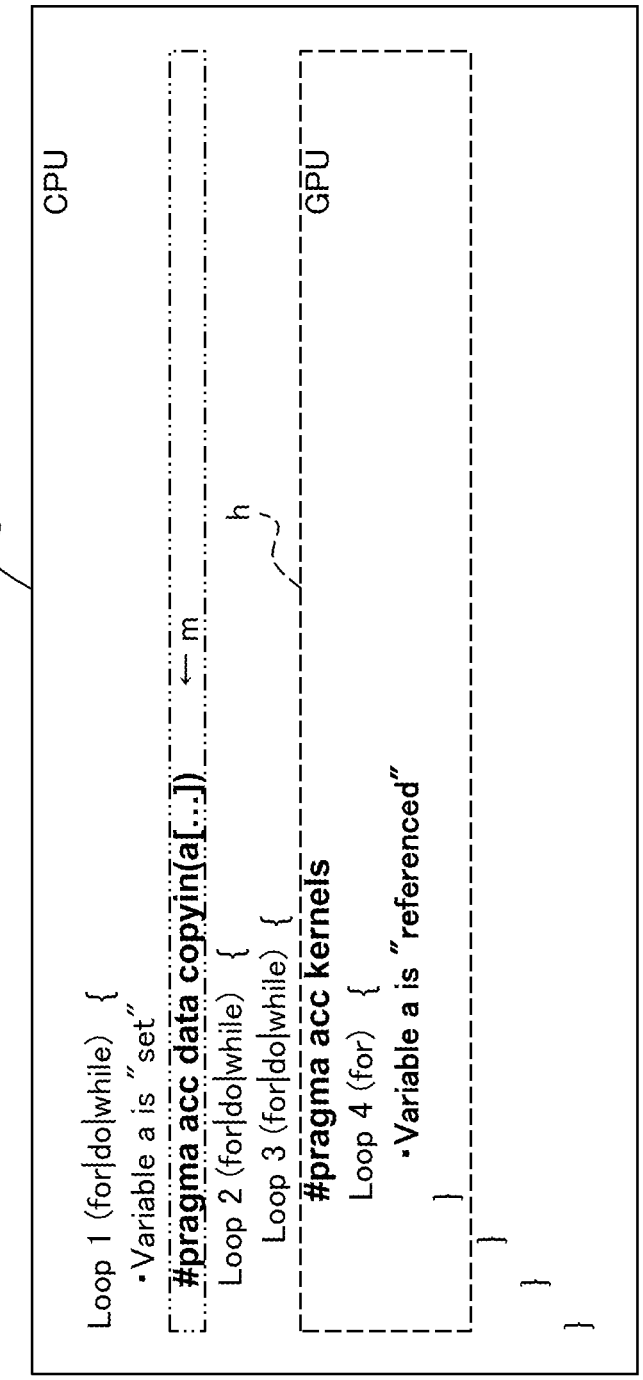
FIG. 6 illustrates an exemplary case of loop statements involving a CPU-to-GPU data transfer in the off-load server according to the embodiment, in which loop statements a variable defined on the CPU program side is referenced by the GPU program side.
Figure 7:
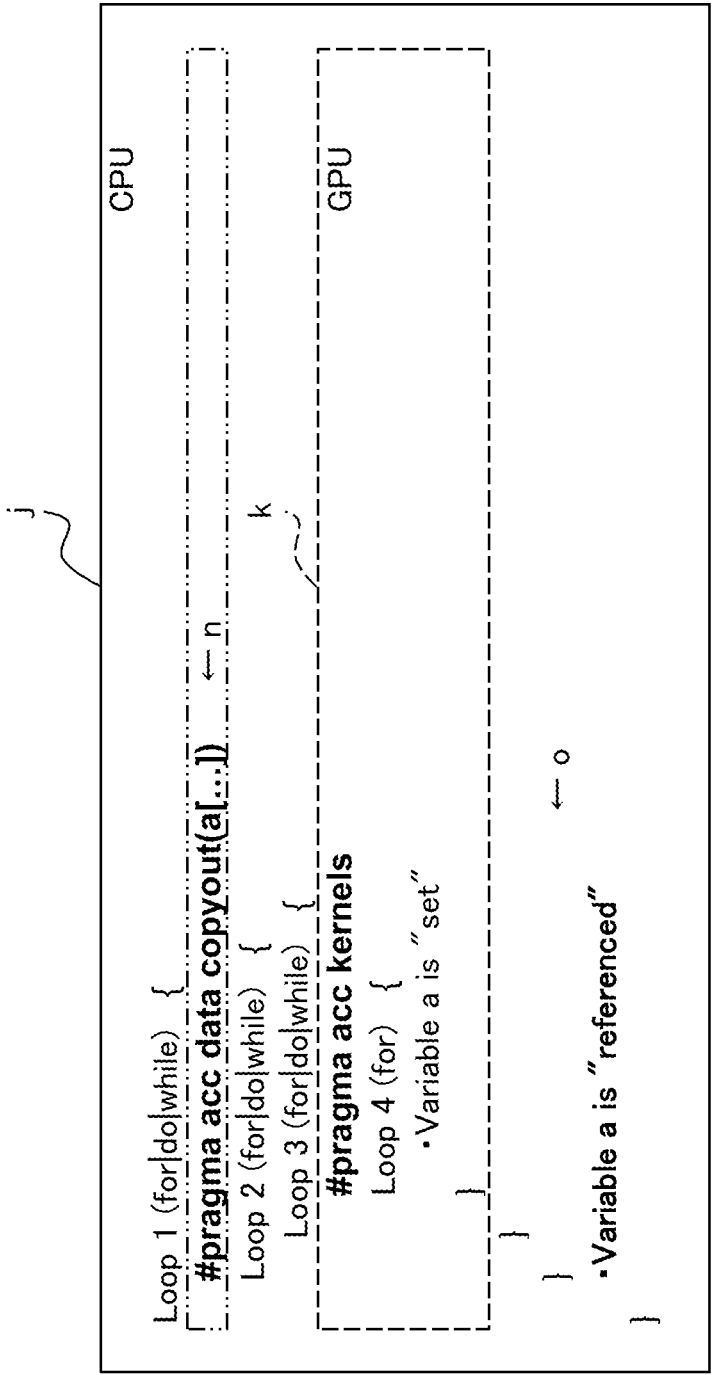
FIG. 7 is a diagram illustrating an exemplary case of loop statements involving a GPU-to-CPU data transfer in the off-load server according to the embodiment, in which loop statements a variable referenced on the CPU program side is set by the GPU program side.

FIGS. 6 and 7 are diagrams illustrating loop statements of a source code of an application that is processed by the environment adaptation function section of the present embodiment. In these cases, a variable defined on the CPU program side is referenced or set by the GPU program side.

The control section (environment adaptation function section) 11 of the present embodiment (see FIG. 2) includes the data transfer designation section 113.

CPU-to-GPU Data Transfer of Present Embodiment

According to the present embodiment, if a variable set and/or defined on the CPU program side is to be referenced by the GPU program side, the need of a CPU-to-GPU data transfer is recognized and a data transfer designation is made.

The position at which the data transfer designation is made is at the loop to be processed by the GPU or at an outer loop thereof which is the outermost loop that includes neither setting nor definition of the variable. (see FIG. 6). The insertion position of the data transfer directive is immediately before a loop, e.g., a for, do, or while loop.

FIG. 6 illustrates an exemplary case of loop statements involving a CPU-to-GPU data transfer, in which loop statements a variable defined on the CPU program side is referenced by the GPU program side.

The loop statements of the present embodiment illustrated in FIG. 6 is described on the CPU program side and includes
  Loop 1 (for|do|while) {
},
which contains therein
  Loop 2 (for|do|while) {
},
which contains therein
  Loop 3 (for|do|while) {
},
which contains therein
  Loop 4 (for) {
}.

In addition, in Loop 1 (for|do|while) {
}, variable a is set and in Loop 4 (for) {
}, variable a is referenced.

Further, in Loop 3 (for|do|while) {
}, a processing part for which parallel processing by PGI compiler for a for statement or the like is available is specified with a directive of OpenACC: #pragma acc kernels (a directive specifying a parallel process) (details described later).

In the loop statements of the present embodiment illustrated in FIG. 6, the data transfer directive #pragma acc data copyin(a[ . . . ]), a copyin clause of the variable a, is inserted at the position indicated by reference character m in FIG. 6.

The above-mentioned data transfer directive #pragma acc data copyin(a[ . . . ]) is specified at the outermost loop including neither setting nor definition of the variable a (in this case, in Loop 1 (for|do|while)), at a position immediately before a loop, e.g., a for, do, or while loop (in this case, before Loop 2 (for|do|while)).

In this manner, a CPU-to-GPU data transfer is explicitly designated by inserting a copyin clause of variable a: #pragma acc data copyin(a[ . . . ]) at the position described above. With this, the data transfer can be performed in a collective manner at the outermost possible loop, thereby to avoid ineffective data transfer such that data is transferred at every loop iteration.

GPU-to-CPU Data Transfer of Present Embodiment

According to the present embodiment, if a variable set on the GPU program side is one referenced, set, or defined by the CPU program side or the variable is a global variable (a variable directly accessible from all the functions), the need of a GPU-to-CPU data transfer is recognized and a data transfer designation is made.

The position at which the data transfer designation is made is at the loop to be processed by the GPU or at an outer loop thereof which is the outermost loop that includes neither reference, setting, nor definition of the variable. (see FIG. 7). The insertion position of the data transfer directive is immediately before a loop, e.g., a for, do, or while loop.

The condition regarding "setting" is introduced to take into account cases in which the setting may or may not be performed depending on a if statement or the like. In addition, the condition regarding "definition" on the CPU side is introduced to provide a guard against exceeding beyond the scope of the variable. The condition regarding global variables is introduced because global variables are possibly "referenced" outside the source code to be analyzed.

FIG. 7 illustrates an exemplary case of loop statements involving a GPU-to-CPU data transfer, in which a variable referenced on the CPU program side is set by the GPU program side.

The loop statements of the present embodiment illustrated in FIG. 7 is described on the CPU program side and includes
  Loop 1 (for|do|while) {
},
which contains therein
  Loop 2 (for|do|while) {
},
which contains therein
  Loop 3 (for|do|while) {
},
which contains therein
  Loop 4 (for) {
}.

In addition, in Loop 3 (for|do|while) {
}, a processing part for which parallel processing by PGI compiler for a for statement or the like is available is specified with a directive of OpenACC: #pragma acc kernels (directive specifying a parallel process).

Further, in Loop 4 (for) {
}, variable a is set, and in Loop 1 (for|do|while) {
}, variable a is referenced.

In the loop statements of the present embodiment illustrated in FIG. 7, the data transfer directive #pragma acc data copyout(a[ . . . ]), a copyout clause of the variable a, is inserted at the position indicated by reference character n in FIG. 7.

The above-mentioned data transfer directive #pragma acc data copyout(a[ . . . ]) is specified at the outermost loop including neither reference, setting, nor definition of the variable a (in this case, in Loop 1 (for|do|while)), at a position immediately before a loop, e.g., a for, do, or while loop (in this case, before Loop 2 (for|do|while)).

The above-described copyout operation is executed after the loop is terminated as indicated by the reference character o in FIG. 7.

In this manner, a GPU-to-CPU data transfer is explicitly specified by inserting a copyout clause of variable a: #pragma acc data copyout(a[ . . . ]) at the position described above. With this, the data transfer can be performed collectively at the outermost possible loop, thereby to avoid ineffective data transfer such that data is transferred at every loop iteration.

Data Transfer in the Both Directions, CPU-to-GPU Data Transfer and GPU-to-CPU Data Transfer, of Present Embodiment When a CPU-to-GPU transfer and a GPU-to-CPU transfer are both to be performed on the same variable, they are collectively specified as data copies in the both directions.

Specifically, a directive #pragma acc data copy(a[ . . . ]) is inserted in place of the directive #pragma acc data copyin(a[ . . . ]) in the loop statements of the present embodiment illustrated in FIG. 6.

The directive #pragma acc data copy(a[ . . . ]) is specified at the outermost loop including neither setting nor definition of the variable a (in this case, in Loop 1 (for|do|while)), at a position immediately before a loop, e.g., a for, do, or while loop (in this case, before Loop 2 (for|do|while)).

In this manner, data transfers in the both directions, a CPU-to-GPU data transfer and a GPU-to-CPU data transfer, are explicitly designated by inserting a copy clause of variable a: #pragma acc data copy(a[ . . . ]) at the position described above. Using the directive #pragma acc data copy(a[ . . . ]), the insertion of the directive #pragma acc data copyout(a[ . . . ]) illustrated in FIG. 7 is omitted.

As described above, according to the present embodiment, data transfer is explicitly specified so as to be performed in a collective manner at a loop located as outer as possible, thereby to avoid ineffective data transfer such that data is transferred at every loop iteration.

GPU Off-Loading Processing

With the above-described collective processing method for data transfer, loop statements suitable for off-loading can be extracted, and inefficient data transfer can be avoided.

It should be noted that even with the above-described collective processing method for data transfer, there is a program that is not suitable for GPU off-loading. For effective GPU off-loading, it is necessary that the number of loops of the process to be off-loaded be large.

In view of this, in the present embodiment, as a phase preceding a full-scale off-loading process finding operation, the number of loop iterations is examined using a profiling tool. Using a profiling tool makes it possible to investigate the number of executions of each line. For example, a program including loop iterations of 50 million can be selected prior to being subjected to the off-load process finding operation. Details (which partially overlap the above descriptions given with reference FIG. 5) are described below.

The present embodiment first analyzes the application in which off-load processing parts are to be found to identify loop statements such as for, do, and while statements. Next, sample processing is executed, and the number of loop iterations of each loop statement is examined using a profiling tool, to determine whether to perform a full-scale, off-load processing part finding operation on the basis of whether the number of the loop iterations is a certain number or more.

When it is determined that a full-scale, off-load process finding operation is to be performed, the GA process is started (see FIG. 5). In the initialization process, the parallelizability of all the loop statements in the application code is checked and then the loop statements that can be parallelized are mapped to a gene sequence, with each loop statement given either a value of 1, indicating that the loop statement is to be processed by GPU processing, or a value of 0, indicating that the loop statement is not to be processed by GPU. The genes are prepared for a specified number of individuals in such a manner that the values of each individual are each assigned a value of 1 or 0 randomly.

Here, in the code corresponding to a gene, an explicit data transfer directive (#pragma acc data copyin/copyout/copy) is added according to the reference relationships of variable data in the loop statement designated as being subjected to a GPU process.

In the evaluation step, the code corresponding to the gene is compiled, and the compiled code is deployed to the verification machine and executed thereon to perform a benchmark performance measurement. A gene corresponding to a pattern with good performance is given a higher degree of fitness. In the code corresponding to the gene, as described above, a parallel processing directive(s) and a data transfer directive(s) (e.g., see reference character m in FIG. 6 and reference character n in FIG. 7) are inserted.

In the selection step, a specified number of individuals corresponding to genes with a high degree of fitness are selected on the basis of the degree of fitness. The present embodiment performs roulette-wheel selection according to the degree of fitness and elite selection of selecting the gene with the highest degree of fitness. In the crossover step, genes are partially swapped at one point between selected individuals at a certain crossover ratio Pc to create offspring individuals. In the mutation step, each value of the genes of the individuals is changed from 0 to 1 or from 1 to 0 at a certain mutation ratio Pm.

When the processes are completed up to the mutation step, and genes of the next generation are created for a specified number of individuals, explicit data transfer directive(s) is/are added in the same manner as the initialization step and then the steps of evaluation, selection, crossover and mutation are repeated.

Finally, at the termination determination step, the processing is terminated after the processes are repeated for a specified number of generations, and a gene with the highest degree of fitness is selected as the solution. With a code pattern having a highest performance corresponding to a gene having a highest fitness, the deployment to the actual environment is performed anew to provide it to the user.

An operation of the control section (environment adaptation function section) 11 of the off-load server 1 illustrated in FIG. 2 is described below with reference to FIG. 4.

Off-Load for FPGA

With a GPU, acceleration is mainly performed through parallel processing of loop statements and the like. With an FPGA, practically, parallel processing and pipeline processing are typically used for acceleration, and as such it is difficult for a machine to automatically generate a logic for off-loading although the degree of freedom of off-loading is high. In view of this, in off-loading with an FPGA, the know-how (well-known patterns) that programmers have accumulated is utilized to perform off-loading in a large unit.

Specifically, when the code functional block using similar code detection and the like determined in the code analysis at step S11 in FIG. 4 is, for example, FFT processing or when an FFT processing is called by a library call, the code functional block is substituted with an FPGA logic already defined for the FFT processing and then off-loading is performed. For such substitution, calls to libraries whose processing can be off-loaded to an FPGA, functional blocks of processing that can be off-loaded to an FPGA, and codes that describe the processing logic of an FPGA for off-loading in OpenCL and HDL are registered in the code pattern DB 132. The control section (environment adaptation function section) 11 collates the code analysis result and the code pattern DB 132, and substitutes off-loadable processes with processing logic descriptions for off-loading to the FPGA.

Resource Amount Adjustment

For the resource amount adjustment at steps S14 and S15 in FIG. 4, first, an appropriate resource ratio is determined, and then resource amounts that match the performance and cost requirements are set. Even when the application is converted, through steps S11-S13 in FIG. 4, into a code that performs off-loading so that the application operates on a CPU and a GPU, and the code is appropriate, good performance will not be achieved when the resource amounts of the CPU and the GPU, which is the off-load destination, are not appropriately balanced. For example, when the processing time of the CPU is 1000 seconds and the processing time of the GPU is 1 second in execution of a certain process, the CPU is the bottleneck. In Non-Patent Literature 2, during processing with MapReduce framework using a CPU and a GPU, an entire performance enhancement is achieved by allocating Map tasks such that an execution time of a CPU and an execution time of a GPU are equal to each other. In the present embodiment, to avoid a deployment in which the processing in either hardware becomes a bottleneck, when determining the resource ratio, the resource amount calculation section 116 determines the resource ratio such that the processing time of the CPU and the processing time of the off-load destination are of equal orders, on the basis of the processing time in an assumed test case.

After the resource ratio is determined, the resource amount calculation section 116 determines, at steps S14 and S15 in FIG. 4, a resource amount such that the processing performance in the assumed test case satisfies the requested performance and cost request specified by the user, while keeping the resource ratio.

Deployment Place Adjustment

In the deployment place adjustment at step S15 in FIG. 4, a place where appropriate performance and cost are achieved is calculated to determine the deployment destination. An optimization calculation method is used as the method for determining the appropriate deployment destination. The information for determining the deployment destination includes performance information on an assumed test case of an application to be deployed (such as a processing delay and throughput), and information on facility resources that can be used for the system (calculation resources such as clouds, edges, and Home GWs, inter-node bandwidths, amounts of those resources already used, and the cost of the use).

The logic for determining the deployment destination is as follows. Based on a performance result of an assumed test case, the amount of calculation and the amount of traffic that would be generated in the event of deploying the application are calculated. Further, a link relationships between clouds, edges, Home GWs and the like are modeled. Under a constraint that the cost incurred when the application is deployed on a specific node satisfies a requirement, either a deployment that maximizes performances regarding the processing delay, throughput and the like or a deployment that minimizes the cost while the performance satisfies a requirement is derived using an optimization method (e.g., linear programming or the like). Here, in the case where an application is divided, for example, into an edge and a cloud, an optimization calculation is performed for the combination thereof.

Deployment Place Adjustment

In the operation verification at step S23 in FIG. 4, after the execution file determined at steps S12 and S13 in FIG. 4 is deployed at the place specified at step S15 in FIG. 4 with the specific resource amounts set at step S14 in FIG. 4, whether an expected operation is achieved is confirmed by executing performance verification test cases and/or regression test cases. When performing the performance verification test cases, assumed test cases specified by the user are executed using an automatic test execution tool such as Jenkins to measure the processing time and/or the throughput. The regression test uses an automatic verification technique (see Non-Patent Literature 3) that retrieves information on software such as middleware and OS installed in the system, and executes corresponding regression tests using Jenkins and the like.

As a result of the operation verification, information on the processing time and/or the throughput of the performance verification test cases and the execution result of the regression tests is presented to the user. At the same time, the ensured resources (such as specs of virtual machines and the number thereof) and their prices are presented to the user, and the user determines whether to start the operation with reference to the information.

Reconfiguration During Operation

In application operation, when an initially expected performance is not achieved due to a change in request characteristics or the like after the operation has started at step S23 in FIG. 4, the reconfiguration simulation trial calculation section 125 reconfigures the software setting and the software/hardware configuration. Determination for a reconfiguration is made as follows. A trial simulation of the code conversion, the resource amount adjustment, and the deployment place adjustment, which are performed at steps S11-S15 in FIG. 4, is performed on the basis of test cases that match the current actual operation, rather than on the basis of the test cases that are assumed before the operation start. Then, when the performance and the cost satisfy the user's expectation, the user provision section 127 proposes a reconfiguration to the user, and, upon approval from the user, performs the reconfiguration. The reconfiguration is performed by a reconfiguration destination construction section 126a (see FIG. 2) of the reconfiguration execution section 126.

Software Setting

Regarding the changing of the software setting, a trial simulation of the processes of steps S14 and S15 in FIG. 4 is performed in a cyclic manner or when the performance is reduced to a threshold or less, in order to calculate the performance improvement and the degree of cost reduction. When there is a prospect of improvement in performance and cost through a change of the resource amounts and/or through a change of the deployment place, a reconfiguration is proposed to the user. When implementing the reconfiguration upon approval from the user, in the event of changing the resources, cloud-related techniques can be used to change the memory size and the like with no disconnection time in many cases.

Migration

In the event of changing the deployment place, a replicated migration destination environment is created using a collective provisioning technique (a method using OpenStack Heat or the like (see Non-Patent Literature 4)) and then migration is performed from the migration source to the replicated environment. The migration is performed by the migration processing section 126b (see FIG. 2) of the reconfiguration execution section 126.

When a disk can be shared in the event of changing the deployment place, a live migration for performing migration of a virtual machine supported by OpenStack and the like is performed. In addition, when the deployment place is largely changed and the migration is performed with disk information being included in the information to be migrated, a block migration is performed. Hardware such as a GPU is typically controlled by a container rather than by a virtual machine, and therefore, in the event of migration of a container, the migration is performed using a container management technique such as LXD.

Software/Hardware Configuration

Changing the software/hardware configuration are performed as follows. A trial simulation of the processing of steps S12 and S13 in FIG. 4 is performed in a cyclic manner or when the performance is reduced to a threshold value or less. Then when there is a prospect of improvement in performance and cost by performing a code conversion to change a soft logic of the GPU off-loading and/or to change a hard logic of the FPGA, a reconfiguration is proposed to the user (see Non-Patent Literature 5). In the event of performing the reconfiguration upon approval from the user, in the case where a change or the like to the soft logic for the GPU off-loading and/or a change to the software configuration is performed, a replicated environment for launching the updated execution file is created and then data of application under execution is migrated.

Hard Logic Change

When the hard logic of an FPGA or the like is changed in the event of performing a reconfiguration, like the case where a software configuration is changed, available methods include: a method including preparing an FPGA whose hard logic has been configured in a migration destination and performing migration of the data of the application being executed; and a method including reconfiguring the hard logic of the FPGA under operation. The hard logic of an FPGA can be reconfigured in an order of seconds during operation by using a recent tool of Altera or Xilinx. An example of a change to the hard logic is such that, when both an SQL DB and a No SQL DB are operated and there is a large number of SQL requests at the beginning but the number of No SQL requests has increased, the logic of an FPGA is reconfigured to accelerate No SQL.

An implementation of the off-load server 1 is described below. This implementation is intended for confirming the effectiveness of the present embodiment.

Outline of Operation of Implementation

Outline of an operation of the implementation is described below.

The implementation is performed using Perl 5 (Perl version 5) to perform the following processing.

Before starting the processing of the flow of FIG. 8 described later, an application to be accelerated and a benchmark tool for measuring the performance thereof are prepared.

The implementation analyzes, upon receipt of a request for utilizing an application, the code of the application to find for statements and to understand the program structure in terms of variable data or the like used in the for statements. The implementation performs a syntax analysis using LLVM/Clang syntax analysis library (python binding of libClang) or the like.

The implementation first performs benchmark testing to check whether there is an expectation that GPU off-loading of the application is effective and gets the number of loop iterations of the for statements identified by the syntax analysis. GNU coverage gcov or the like is used to get the number of loop iterations. As a profiling tool, "GNU profiler (gprof)", and "GNU coverage (gcov)" are known. Both of them can examine the number of executions for each line, and therefore either of them may be used. An example of the condition for applications to be chosen as to the number of executions is such that only applications with 10 million or more loop iterations be chosen. This number of loop iterations is modifiable.

A general-purpose, CPU-based application has not been implemented assuming parallelization. For this reason, for statements for which GPU processing is in the first place impossible need to be excluded. In view of this, the implementation inserts, as a trial, the directive "#pragma acc kernels" for parallel processing for each of the for statements and determines whether a compilation error occurs. There are various types of compilation errors. Examples of the errors include a case in which an external routine is called in a for statement, a case in which different hierarchy levels are designated in a duplicate manner in nested for statements, a case in which there is processing to exit a for statement by a break statement or the like, and a case there is dependency between data in for statements. Errors other than described above could be issued as various compilation errors in a manner depending on the application. The implementation excludes for statements causing a compilation error from those to be processed and thus does not insert the #pragma directive for such for statements.

Compilation errors are difficult to be processed automatically. In addition, it is often that processing compilation errors even results in no effect. In the case of calling an external routine, compilation errors could be sometimes avoided by "#pragma acc routine". However, most of the calls to an external routine is a library call. Even when the call is included in the GPU processing, the call becomes a bottleneck and good performance will not be achieved. As the for statements are processed for trial one by one, no compilation error occurs in connection with nesting. In addition, in the case of breaking out halfway through by a break or the like, it is necessary to fix the number of loops for parallel processing, which requires program conversion. In the case of presence of data dependency, the parallel processing is in the first place impossible.

Here, when the number of loop statements that do not cause an error even when processed in parallel is A, the gene length is A. The application code is mapped to a gene with length A in such a manner that a value of 1 of the gene corresponds presence of a parallel processing directive and a value of 0 of the gene corresponds to absence of a parallel processing directive Next, gene sequences whose number is specified as the number of individuals are prepared as initial values. The values of genes are each randomly assigned a value of 0 or 1 as described with reference to FIG. 5. According to the prepared gene sequence, a directive #pragma acc kernels that specifies parallel processing is inserted into the C/C++ code for each gene assigned a value of 1. At this stage, in a code corresponding to a certain gene, a part to be processed by the GPU is determined. On the basis of the reference relationships analyzed by the above-mentioned Clang regarding the variable data in for statements, directives for CPU-to-GPU data transfers and data transfers in the opposite direction are specified in accordance with the above-described rules.

Specifically, a variable that needs to be transferred from a CPU to a GPU is specified in a #pragma acc data copyin directive (see FIG. 6) and a variable that needs to be transferred from a GPU to a CPU is specified in a #pragma acc data copyout directive (see FIG. 7). When the same variable is to be specified in copyin and copyout directives, they are collectively described by a #pragma acc data copy directive for simplification.

The C/C++ code into which the parallel processing directives and the data transfer directives have been inserted is compiled by PGI compiler on a machine equipped with a GPU. The compiled execution file is deployed and subjected to the performance measurement by benchmark tools.

For each of all the individuals, after being subjected to the benchmark performance measurement, a degree of fitness of the gene sequence is set according to its benchmark processing time. The individuals to be left are selected according to the degrees of fitness set to the individuals. The selected individuals are subjected to the GA processing of crossover, mutation, and faithful copy processes, to create a set of individuals of the next generation.

The next-generation individuals are then subjected to the processes of the directive insertion, compilation, performance measurement, setting of the degree of fitness, selection, crossover, and mutation. Here, if a gene having the same pattern as before is generated in the GA processing, the compilation and performance measurement are not performed for that individual and the same measurement value as before is used.

After the GA processing has been completed for a specified number of generations, the code with the directives corresponding to the gene sequence with the highest performance is selected as a solution.

In the above-described processes, the number of individuals, the number of generations, the crossover ratio, the mutation ratio, the setting of degree of fitness, and the selection method are parameters of the GA and are separately specified. The proposed technique automates the above-described processes to enable automation of GPU off-loading, which conventionally requires the time and skill of specialized engineers.

Figure 8A:
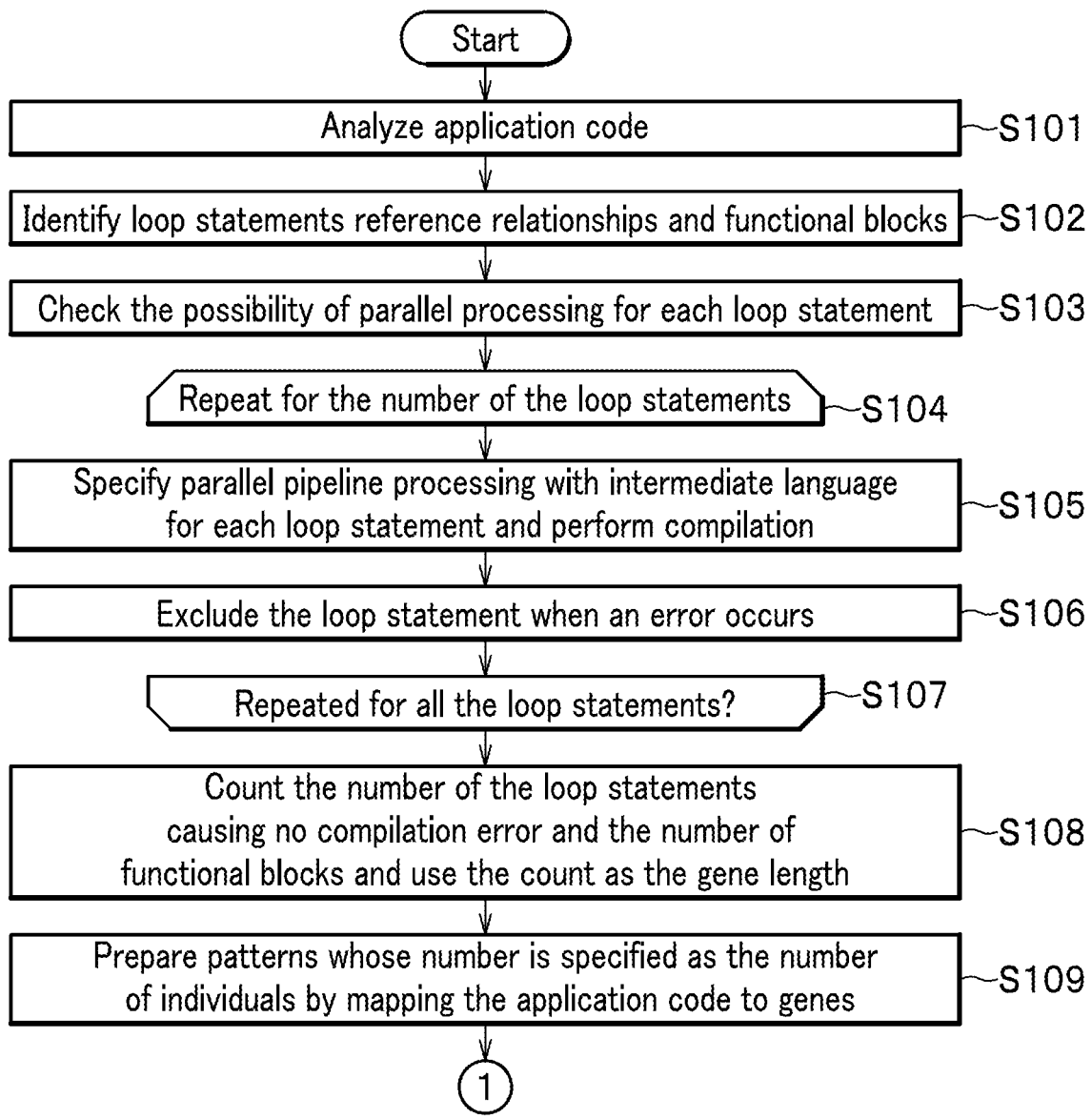
FIG. 8A is a flowchart for explaining an outline of operations of implementation of the off-load server according to the embodiment.
Figure 8B:
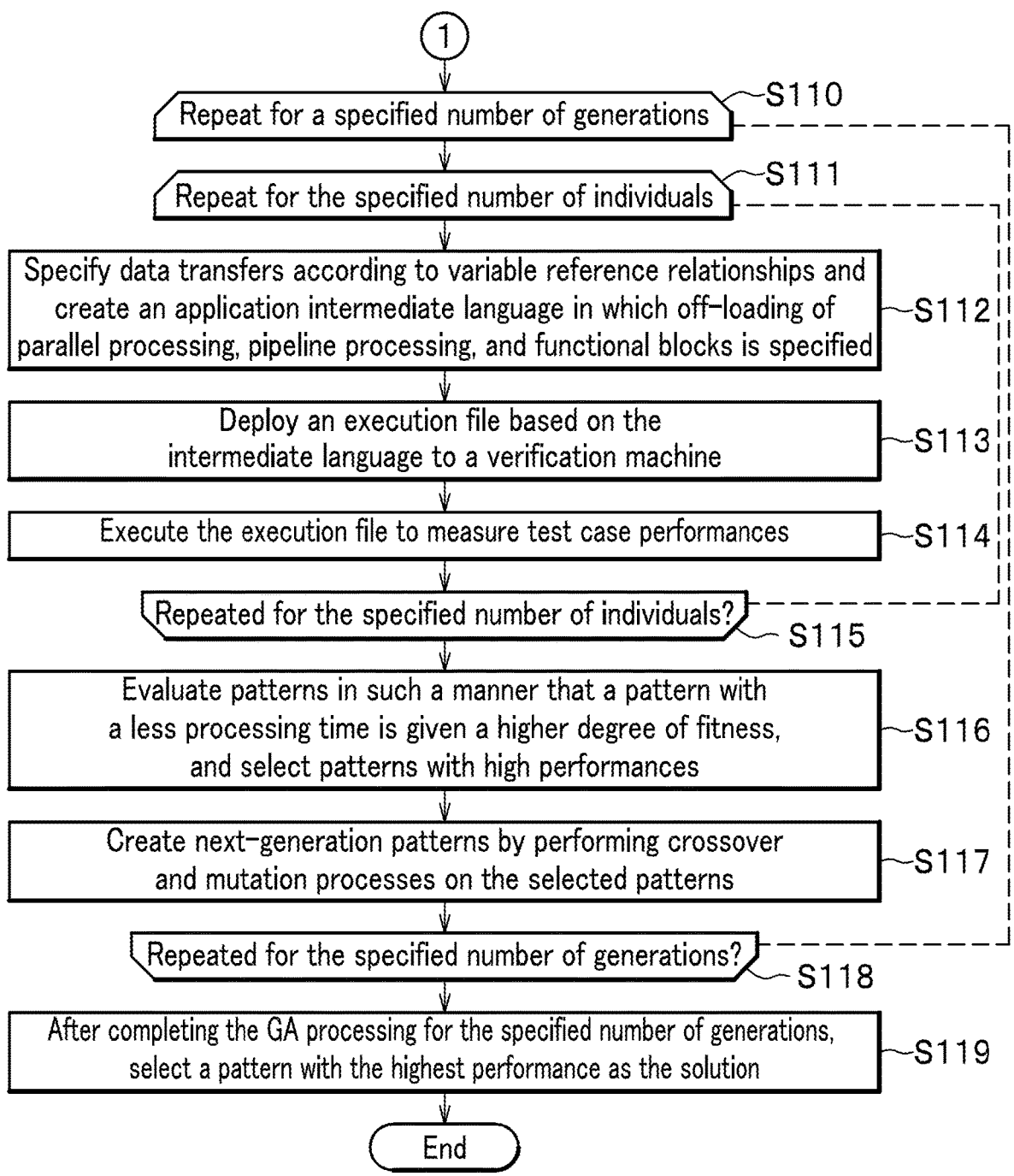
FIG. 8B is a flowchart for explaining an outline of operations of implementation of the off-load server according to the embodiment.

FIGS. 8A and 8B are flowcharts for explaining an outline of the operations of the above-described implementation. FIG. 8A and FIG. 8B are connected via a connector.

Code Analysis

At step S101, the application code analysis section 112 (see FIG. 2) analyzes the application code.

Loop Statement Identification

At step S102, the off-load processing designation section 114 (see FIG. 2) identifies loop statements, reference relationships, and functional blocks of the application.

Possibility of Parallel Processing of Loop Statement

At step S103, the off-load processing designation section 114 checks the possibility of parallel processing for each loop statement.

Iteration of Loop Statement

The control section (environment adaptation function section) 11 repeats the processes of steps S105 and S106 for the number of loop statements between the loop start at step S104 and the loop end at step S107.

At step S105, for each loop statement, the off-load processing designation section 114 specifies pipeline processing in an intermediate language and performs compilation. Note that parallel processing is a type of pipeline processing.

At step S106, when an error occurs, the off-load processing designation section 114 excludes the corresponding loop statement.

At step S108, the off-load processing designation section 114 counts the number of loop statements that do not cause compilation errors and the number of the functional blocks, and uses the count as the gene length.

Preparation of Patterns for a Specified Number of Individuals

Next, the off-load processing designation section 114 prepares, as initial values, gene sequences whose number is specified as the number of individuals. The initial values are created by randomly assigning values of 1 and 0.

At step S109, the off-load processing designation section 114 maps the application code to genes to prepare a specified number of patterns.

According to the prepared gene sequences, when the value of a gene is 1, a directive that specifies parallel processing is inserted to the code (see, e.g., #pragma directive in FIG. 5).

The control section (environment adaptation function section) 11 repeats the processes of steps S111 to S118 for a specified number of generations between the loop start at step S110 and the loop end at step S118.

In addition, in the iterations for the above-described specified number of generations, the processes of steps S112 to S114 are further repeated for a specified number of individuals between the loop start at step S111 and the loop end at step S115. That is, in the iterations for the specified number of generations, the iterations for the specified number of individuals are processed in a nested manner.

Data Transfer Designation

At step S112, the data transfer designation section 113 specifies data transfers on the basis of the variable reference relationships, and creates an intermediate language of an application that specifies off-loading of parallel processing, pipeline processing, and functional blocks in a specific pattern.

At the above-described step S112, the processing up to the identifying of loop statements is commonly processed, and subsequently, processing corresponding to a GPU, an FPGA, pipeline processing, or a functional block, e.g., FFT processing, is performed. For example, in the case of a GPU, parallel processing is performed; in the case of an FPGA, parallel processing and/or pipeline processing is performed; and in the case of a functional block, such as FFT processing, an intermediate language for off-loading is created.

Note that with an example of parallel processing, which is a type of pipeline processing, data transfer specification using an explicit instruction line (#pragma acc data copy/copyin/copyout) is described above with reference to FIGS. 6 and 7.

Compilation

At step S113, the verification environment performance measurement section 119 (see FIG. 2) deploys an execution file based on the intermediate language to the verification machine 14 equipped with CPU-GPU.

At step S114, the verification environment performance measurement section 119 executes the deployed binary file and measures the test case performances.

Here, in intermediate generations, if a gene has the same pattern as before, that gene of the intermediate generation is not measured, and the same value is used. Specifically, if a gene having the same pattern as before is created in the GA processing, the compilation and the performance measurement are not performed for that individual and the same measurement value as before is used.

At step S116, the execution file creation section 120 (see FIG. 2) evaluates patterns in such a manner that a pattern with a less processing time is given a higher degree of fitness, and selects patterns with high performances.

At step S117, the execution file creation section 120 performs processes of crossover and mutation on the selected patterns to create patterns of the next generation. The patterns of the next generation are then subjected to the processes of compilation, performance measurement, evaluation of the degree of fitness, selection, crossover, and mutation.

In other words, for each of all the individuals, after being subjected to the benchmark performance measurement, a degree of fitness of each gene sequence is set according to its benchmark processing time. The individuals to be left are selected according to the degrees of fitness set to the individuals. The selected individuals are subjected to the GA processing of crossover, mutation, and faithful copy processes, to create a set of individuals of the next generation.

At step S119, after the GA processing is completed for a specified number of generations, the execution file creation section 120 selects a code corresponding to the gene sequence having the highest performance (off-load pattern having the highest performance) as a solution.

GA Parameter

The number of individuals, the number of generations, the crossover ratio, the mutation ratio, the setting of degree of fitness, and the selection method described above are parameters of the GA. The parameters of the GA may be set as follows, for example.

The parameters and conditions of Simple GA to be performed may be set as follows, for example:

Gene Length: The Number of Parallelizable Loop Statements

Number of individuals M: A number equal to or less than the gene length

Number of generations T: A number equal to or less than the gene length

Degree of fitness: (Processing time)$^{(-1/2)}$

With this settings, the shorter the processing time, the higher the degree of fitness. In addition, by defining the degree of fitness as the processing time raised to the minus one-half power, it is possible to prevent a situation such that as an excessively high degree of fitness is given to a certain individual whose processing time is short and thus the search range is narrowed. In addition, when the performance measurement is not completed in a certain time, the measurement is timed out and the degree of fitness is calculated by considering the processing time as being a processing time of 1000 seconds or the like (a long time). This timeout period may be changed according to the characteristics of the performance measurement.

Selection: Roulette-Wheel Selection

It should be noted, elite saving, in which a gene with the highest degree of fitness in a generation is saved in the next generation without being subjected to crossover and mutation processes, is also performed.

Crossover ratio Pc: 0.9

Mutation ratio Pm: 0.05

Cost Performance

The following describes the cost performance of the automatic off-load function.

Taking into consideration only the prices of the hardware of GPU boards such as NVIDIA Tesla (registered trademark), the price of a machine equipped with a GPU is about twice the price of a normal machine having only a CPU. However, in general, the cost of hardware and system development is equal to or less than one-third of the cost of a data center or the like. The electricity bills and the operating cost of maintenance and operation systems are over one-third, and other costs such as service orders are about one-third. The present embodiment is capable of increasing the performance of time-consuming processing, e.g., cryptographic processing and/or image processing, of an application to be improved by a factor of two or more. Consequently, even when the price of the server hardware doubles, the cost effect can be fully expected.

According to the present embodiment, applications requiring a large execution time due to a large number of loop iterations are identified in advance using gcov and/or gprof or the like and the off-loading is executed for trial. In this manner, it is possible to find applications that can be efficiently accelerated.

Time to Start Actual Service Use

The following describes time to start actual service use.

On the assumption that the time taken for compilation to performance measurement is about 3 minutes for each time, it will take about 20 hours at most for a GA with 20 individuals and 20 generations to search for a solution, but it will take less than 8 hours because the compilation and measurement of the same gene patterns as before are omitted. In most cloud computing, hosting, and network services, it practically takes about half a day to start using the service. The present embodiment can achieve automatic off-load within half a day, for example. In view of this, assuming that the automatic off-loading is finished within half a day and that the user can use the service for trial at the beginning, it is expected that user satisfaction will be sufficiently improved.

To find the areas to be off-loaded in a shorter time, it is conceivable to perform performance measurement in parallel using a plurality of verification machines whose number is the same as the number of individuals. Adjustment of the timeout time according to applications also leads to time saving. Examples thereof include causing a timeout when an off-load process takes more than twice the execution time in a CPU. In addition, the greater the number of individuals and the number of generations, the higher the possibility of finding a high-performance solution. However, when each parameter is maximized, it is necessary to perform compilations and performance benchmarks for the number of individuals×the number of generations. In view of this, it takes time to start the actual service use. In the present embodiment, while the number of individuals and the number of generations are small as a GA, a wide range is searched with the crossover ratio Pc set to a value as high as 0.9, and thus it is possible to find a solution with a certain performance in an early time.

As described above, the off-load server 1 (see FIG. 2) according to the present embodiment includes: the application code analysis section 112 configured to analyze the source code of the application; the off-load processing designation section 114 configured to identify off-loadable processes of the application, the off-loadable processes including loop statements that can be processed in parallel, functional blocks of specific processing, and library calls; the off-load pattern creation section 115 (code conversion section) configured to perform the code conversion according to the deployment destination environment; the verification environment performance measurement section 119 configured to compile the application on which the code conversion has been performed, deploy the application to the verification machine 14, and perform processing for measuring the performance of the application in the event of off-loading the off-loadable processes of the application to the verification machine 14; the resource amount assignment section 117 configured to make a setting for resource amounts according to a deployment destination environment; the deployment destination calculation section 118 configured to, when the converted code converted by the off-load pattern creation section 115 is deployed while ensuring the resource amount set by the resource amount assignment section 117, select a deployment place by calculating the deployment destination on the basis of the performance and the cost; the actual environment performance measurement test execution section 123 configured to, after the execution file has been deployed, perform an automatic execution of the performance test items extracted by the actual environment performance measurement test extraction section 122, by using the operation device 15; and the control section 11 (environment adaptation function section) configured to perform the environment adaptation process that executes one or more of the code conversion step, the resource amount setting step, the deployment place selection step, the performance measurement step, and the performance measurement test step.

With this configuration, applications can be operated with high performance by appropriately utilizing GPUs and FPGAs by adapting the application to the environment in increasingly diversified environments including GPUs, FPGAs, and IoT devices. In addition, software that is described once can be operated with high performance also in different environments.

According to the present embodiment, the off-load processing designation section 114 is configured to use the number of the loop statements not causing a compilation error as a gene length according to a genetic algorithm. The off-load pattern creation section 115 is configured to prepare gene patterns whose number is specified as the number of individuals, wherein accelerator processing availability is mapped to the gene patterns in such a manner that performing accelerator processing is assigned one of 1 and 0 and not performing accelerator processing is assigned the other of 1 and 0, and wherein each value of the genes are randomly assigned 1 or 0. The verification environment performance measurement section 119 compiles, according to each individual, an application code in which directives specifying parallel processes by accelerators are specified, deploys the compiled code to the verification machine 14, and performs processing for measuring the performance on the verification machine 14. The execution file creation section 120 is configured to perform a performance measurement for all the individuals, evaluate the individuals in such a manner that an individual with a less processing time is given a higher degree of fitness, select individuals each having a degree of fitness higher than a predetermined value from all the individuals as individuals with high performances, create next-generation individuals by performing crossover and mutation processes on the selected individuals, and after completing processing for a specified number of generations, select an off-load pattern with a highest performance as the solution.

In this manner, the embodiment first checks if loop statements can be parallelized and then, for a set of iteration statements that can be parallelized, repeatedly performs a performance verification trial on a verification environment using a GA to find appropriate areas. By narrowing down to the for statements that can be parallelized and maintaining and recombining off-load patterns that may possibly achieve acceleration in the form of a part of gene, a pattern that achieves acceleration can be efficiently found from an enormous number of available off-load patterns.

According to the present embodiment, the deployment destination environment includes an FPGA, and the off-load processing designation section 114 is configured to consult the code pattern DB, identify, on the basis of an application processing structure including functional block processing and library calls, processes off-loadable to the FPGA, which processes include functional block processing and library calls, and put definition information of an intermediate language corresponding to the off-loading from the code pattern DB into the application source code by substitution.

In this manner, processes which includes functional block processing and library calls and which are off-loadable to an FPGA can be identified and put into the application source code by substitution.

According to the present embodiment, the resource amount assignment section 117 is configured to, based on the processing times of application test cases, determine a resource ratio between the CPU and the off-load destination such that the processing time of the CPU and the the processing time of the off-load destination are of equal orders, and to, after determining the resource ratio, set resource amounts such that the processing performance of assumed test cases satisfies a required performance and a cost, while keeping the resource ratio.

In this manner, it is possible to set the resource ratio between the CPU and the off-load destination and set the resource amounts while satisfying the requested performance and cost.

According to the present embodiment, the deployment destination calculation section 118 is configured to calculate, based on the result of application test cases, the amount of calculation and the amount of traffic that would be generated in the event of deploying the application, model a relationship of links between devices including clouds, edges, and Home GWs, and, under a constraint that a cost incurred when the application is deployed on a specific node satisfies a requirement, calculate, using linear programming, either a deployment that maximizes the performance regarding the processing delay and/or the throughput or a deployment that minimizes the cost in such a manner that the performance satisfies the requested condition.

With this configuration, it is possible to maximize the performance regarding the processing delay and throughput or to select a deployment place where the cost is minimized while the performance satisfies the requirement.

The present embodiment provides the reconfiguration execution section 126, which is configured to reconfigure the software setting when an initially expected performance is not achieved after the operation of the application is started.

With this configuration, it is possible to propose a reconfiguration to the user and, upon approval from the user, perform migration of the application execution environment.

According to the present embodiment, the reconfiguration execution section 126 is configured to: perform a trial simulation of a code conversion in a cyclic manner or when the performance is reduced to a threshold value or less; propose a reconfiguration to the user when there is a prospect of improvement in performance and cost by performing a code conversion to change the soft logic of GPU off-loading and/or to change a hard logic of the FPGA; and, upon approval from the user, change a software logic of GPU off-loading when performing the reconfiguration. When changing the software configuration, the migration processing section 126b performs migration of the data of the application after creating a replicated environment in which the updated execution file is to be launched. When changing the hard logic of the FPGA, the migration processing section 126b prepares an FPGA whose hard logic has been configured in the migration destination and performs migration of a container or the like that controls the FPGA. Alternatively, the reconfiguration execution section reconfigures the hard logic of the FPGA.

With this configuration, when a reconfiguration is proposed to the user and approval is obtained from the user, it is possible to perform migration of application data in the event of changing the software configuration and to prepare an FPGA whose hard logic has been configured and perform migration of a container or the like that controls the FPGA.

Among the processing described in the embodiment, all or some of the processing described as being performed automatically may be performed manually, or all or some of the processing described as being performed manually may be performed automatically using a known method. In addition, information including the processing procedures, the control procedures, the specific names, and the various types of data, and various parameters described in the aforementioned document and drawings can be modified as desired unless otherwise specified.

Further, the respective components of the devices, which have been illustrated, are functional and conceptual ones, and are not necessarily physically configured as illustrated. That is, the specific modes of dispersion and integration of the devices are not limited to those illustrated and all or some of the devices can be configured such that they are functionally or physically dispersed or integrated in any units according to various loads, use conditions, or the like.

In addition, some or all of the above-described components, functions, processing sections and processing means may be partially or entirely realized through hardware by designing them, for instance, on an integrated circuit. Moreover, the above components or functions might also be realized through software that causes a processor to interpret and execute programs realizing respective functions. Information such as programs, tables or files realizing the functions can be stored in storage devices such as memories, hard disks, or solid state drives (SSDs) or in recording media such as integrated circuit (IC) cards, secure digital (SD) cards, or optical disks.

The present embodiment uses a method of genetic algorithm (GA) to find a solution of a combinatorial optimization problem in a limited period of time for optimization. However, the optimization method can be any method. For example, a local search method, a dynamic programming method, or a combination of them can be used.

Moreover, although the present embodiment uses Open-ACC compiler for C/C++, any compiler that can off-load processing to a GPU can be used. For example, Java lambda (registered trademark) GPU processing of IBM Java 9 SDK (registered trademark) can be used. It should be noted that the parallel processing directives depend on these development environments.

For example, Java (registered trademark) 8 or later allows description of parallel processing in the lambda format. IBM (registered trademark) provides a JIT compiler that off-loads parallel processing descriptions in the lambda format to a GPU. When using Java, using these, performing GA to tune as to whether to convert loop processing into lambda format makes it possible to perform the same off-loading.

In the description of the present embodiment, for statements are exemplified as iteration statements (loop statements). However, the iteration statements include while statements and do-while statements in addition to for statements. However, for statements, which specifies the continuation conditions or the like, are more suitable.

REFERENCE SIGNS LIST

1 Off-load server
11 control section
12 input/output section
13 storage section
14 Verification machine (Accelerator verification device)
15 Operation device
15 Open IoT resource
111 application code designation section
112 application code analysis section
113 data transfer designation section
114 off-load processing designation section
114a off-loadable area extraction section
114b intermediate language file output section
115 off-load pattern creation section
116 resource amount calculation section (resource amount setting section)
117 resource amount assignment section (resource amount setting section)
118 deployment destination calculation section (deployment place selection section)
119 verification environment performance measurement section
120 execution file creation section
121 actual environment deployment section
122 actual environment performance measurement test extraction section
123 actual environment performance measurement test execution section
124 reconfiguration necessity periodic check section
125 reconfiguration simulation trial calculation section
126 reconfiguration execution section
126a reconfiguration destination construction section
126b migration processing section
127 user provision section
130 Application code
131 Test case DB
132 Code pattern DB
133 Facility resource DB
134 Intermediate language file
151 Io GW-equipped device
152 CPU-GPU-equipped device
153 CPU-FPGA-equipped device
154 CPU-equipped device

The invention claimed is:

1. A method of optimal software deployment by an off-load server configured to off-load specific processing of an application to an accelerator,
the method being executed by a processor of the off-load server, the method comprising steps of:
analyzing a source code of the application;
designating off-loadable processes of the application, the off-loadable processes each comprising a loop statement that can be processed in parallel, a functional block of specific processing, or a library call;
performing a code conversion according to a deployment destination environment;
performing a verification environment performance measurement process comprising compiling the application to which the code conversion has been performed, deploying the compiled application to an accelerator verification device, and executing processing for measuring a first performance of the compiled application in a first event of off-loading the off-loadable processes of the compiled application to the accelerator verification device;
repeating the steps of analyzing the source code of the application, designating the off-loadable processes of the application, performing the code conversion, and performing the verification environment performance measurement process;
making a setting for resource amounts according to the deployment destination environment;
selecting a deployment place by calculating a deployment destination on a basis of a second performance and a cost when the converted code converted by the step of performing the code conversion is deployed while ensuring the resource amounts set by the step of making a setting for the resource amounts;
after deployment to an actual environment, performing a performance measurement test process comprising recompiling the application, deploying the recompiled application to an operation device, and performing a measurement test for measuring an actual performance in a second event of off-loading the application to the operation device;
after the step of performing the performance measurement test process, performing one or more of the step of performing the code conversion, the step of making the setting for resource amounts, the step of selecting the deployment place, the step of performing the verification environment performance measurement process, and the step of performing the performance measurement test process; and performing a reconfiguration reconfiguring software settings when an initially expected performance is not achieved after an operation of the application is started, wherein the step of performing the reconfiguration comprises:

constructing a reconfiguration destination and performing migration processing, to change software settings;

performing a trial simulation of code conversion processing in a cyclic manner or when the performance is reduced to a threshold value or less;

proposing a reconfiguration to a user when there is a prospect of improvement in performance and cost by performing a code conversion to change a software logic of GPU off-loading and/or to change a hard logic of a field programmable gate array (FPGA); and, upon approval from the user, changing the software logic of GPU off-loading in a third event of performing the reconfiguration, wherein when changing a software configuration, the step of performing migration processing comprises migrating data of the application after creating a migration destination environment, in which an updated execution file is to be launched, and wherein when changing the hard logic of the FPGA, either:

the step of performing migration processing comprises preparing an FPGA whose hard logic has been configured in the migration destination and performing a migration of a container configured to control the FPGA; or the performing the reconfiguration comprises reconfiguring the hard logic of the FPGA.

2. The method according to claim 1, further comprising:

performing an off-load pattern creation process comprising excluding loop statements causing a compilation error from loop statements to be off-loaded and creating a plurality of off-load processing patterns each of which specifies whether to perform off-load processing for each of the loop statements not causing the compilation error; and performing an execution file creation process comprising selecting an off-load processing pattern with a highest processing performance from the plurality of off-load processing patterns on a basis of a result of performance measurements repeated for a predetermined number of times and compiling the application according to the off-load processing pattern with the highest processing performance to create an execution file, wherein the step of designating the off-loadable processes of the application comprises setting a number of the loop statements not causing a compilation error as a gene length according to a genetic algorithm, wherein the step of performing the off-load pattern creation process comprises preparing gene patterns whose number is specified as a number of individuals, whose gene values are each randomly assigned a value of 1 or 0, and to which accelerator processing availability is mapped in such a manner that performing accelerator processing is assigned one of 1 and 0 and not performing acceleration processing is assigned the other of 1 and 0, wherein the step of performing the verification environment performance measurement process comprises:

compiling, according to each of the individuals, an application code in which directives specifying parallel processes by the accelerator are specified;

deploying the compiled application code to the accelerator verification device; and performing processing for measuring the performance of the individual on the accelerator verification device, and wherein the step of performing the execution file creation process comprises:

performing a performance measurement for all the individuals; evaluating the individuals in such a manner that an individual with less processing time is given a higher degree of fitness;

selecting an individual having a degree of fitness higher than a predetermined value from all the individuals as an individual with a high performance;

creating next-generation individuals by performing crossover and mutation processes on the selected individual; and after completing processing for a specified number of generations, selecting an off-load pattern with a highest performance as a solution.

3. The method according to claim 1, wherein the deployment destination environment includes a field programmable gate array (FPGA) as the accelerator, and wherein the step of designating the off-loadable processes of the application comprises:

identifying, from an application processing structure including functional block processing and library calls, the off-loadable processes which include the functional block processing and the library calls and which are off-loadable to the FPGA, with reference to a code pattern database (DB); and putting definition information of an intermediate language from the code pattern DB into an application source code by substitution, the definition information corresponding to a code for off-loading the off-loadable processes.

4. The method according to claim 1, wherein the step of making the setting for the resource amounts comprises:

determining, based on a processing time of an application test case, a resource ratio between a CPU and an off-load destination such that a processing time of the CPU and a processing time of the off-load destination are of equal orders; and, after determining the resource ratio, setting resource amounts such that processing performance of an assumed test case satisfies a required performance and a cost, while keeping the resource ratio.

5. The method according to claim 1, wherein the step of selecting the deployment place comprises:

calculating, based on a result of an application test case, an amount of calculation and an amount of traffic that would be generated in the first event of deploying the application;

modeling a relationship of links between devices including clouds, edges, and Home Gateways (GWs); and under a constraint that a cost incurred when the application is deployed on a specific node satisfies a requirement, calculating either a deployment that maximizes the performance regarding a processing delay and/or a throughput or a deployment that minimizes the cost in such a manner that the performance satisfies a requested condition.

6. The method according to claim 1,
wherein the step of constructing the reconfiguration destination comprises:
making a trial calculation of the resource amounts setting and deployment place selection in a trial simulation, in a cyclic manner or when the performance is reduced to a threshold or less, to calculate a performance improvement and a degree of cost reduction;
when there is a prospect of improvement in performance and cost through a change of the resource amounts and/or through a change of the deployment place, proposing a reconfiguration to a user; and
upon approval from the user, changing a resource when performing the reconfiguration, and
wherein the step of performing migration processing comprises:
creating the migration destination environment in a fourth event of changing the deployment place; and
performing migration of a application execution environment to the created environment from a migration source.

7. A non-transitory computer-readable medium storing a computer program configured to cause an off-load server to execute a method of software deployment, the off-load server configured to off-load specific processing of an application to an accelerator,
the method comprising steps of:
analyzing a source code of the application;
designating off-loadable processes of the application, the off-loadable processes each comprising a loop statement that can be processed in parallel, a functional block of specific processing, or a library call;
performing a code conversion according to a deployment destination environment;
performing a verification environment performance measurement process comprising compiling the application to which the code conversion has been performed, deploying the compiled application to an accelerator verification device, and executing processing for measuring a first performance of the compiled application in a first event of off-loading the off-loadable processes of the compiled application to the accelerator verification device;
repeating the steps of analyzing the source code of the application, designating the off-loadable processes of the application, performing the code conversion, and performing the verification environment performance measurement process;
making a setting for resource amounts according to the deployment destination environment;
selecting a deployment place by calculating a deployment destination on a basis of a second performance and a cost when the converted code converted by the step of performing the code conversion is deployed while ensuring the resource amounts set by the step of making a setting for the resource amounts;
after deployment to an actual environment, performing a performance measurement test process comprising compiling recompiling the application, deploying the recompiled application to an operation device, and performing a measurement test for measuring an actual performance in a second event of off-loading the application to the operation device;
after the step of performing the performance measurement test process, performing one or more of the step of performing the code conversion, the step of making the setting for resource amounts, the step of selecting the deployment place, the step of performing the verification environment performance measurement process, and the step of performing the performance measurement test process; and
performing a reconfiguration reconfiguring software settings when an initially expected performance is not achieved after an operation of the application is started,
wherein the step of performing the reconfiguration comprises:
constructing a reconfiguration destination and performing migration processing, to change software settings;
performing a trial simulation of code conversion processing in a cyclic manner or when the performance is reduced to a threshold value or less:
proposing a reconfiguration to a user when there is a prospect of improvement in performance and cost by performing a code conversion to change a software logic of GPU off-loading and/or to change a hard logic of a field programmable gate array (FPGA); and,
upon approval from the user, changing the software logic of GPU off-loading in a third event of performing the reconfiguration, wherein when changing a software configuration, the step of performing migration processing comprises migrating data of the application after creating a migration destination environment, in which an updated execution file is to be launched, and wherein when changing the hard logic of the FPGA, either:
the step of performing migration processing comprises preparing an FPGA whose hard logic has been configured in the migration destination and performing a migration of a container configured to control the FPGA; or
the performing the reconfiguration comprises reconfiguring the hard logic of the FPGA.

* * * * *